United States Patent [19]
Armstrong et al.

[11] 3,827,284
[45] Aug. 6, 1974

[54] APPARATUS AND METHOD FOR PROCESSING AND TESTING MANUFACTURED ARTICLES

[75] Inventors: Thaddeus J. Armstrong, Elmwood Park; John A. Styczen, Niles; Ladislav J. Klasek, North Riverside, all of Ill.

[73] Assignee: Continental Can Company, New York, N.Y.

[22] Filed: Apr. 14, 1972

[21] Appl. No.: 244,063

[52] U.S. Cl. .......................... 73/45.1, 209/88 R
[51] Int. Cl. .......................... G01m 3/26
[58] Field of Search .............. 73/45.1, 45.2, 37, 40, 73/45; 209/80, 88 R; 235/201 PS, 201 PF

[56] References Cited
UNITED STATES PATENTS

| | | | |
|---|---|---|---|
| 3,307,390 | 3/1967 | Behrens et al. | 73/45.2 |
| 3,499,314 | 3/1970 | Roberts et al. | 73/45.2 |
| 3,633,742 | 1/1972 | Melton | 73/37 X |
| 3,683,676 | 8/1972 | Hass | 73/45.1 |
| 3,724,655 | 4/1973 | Clark | 73/45.1 X |

*Primary Examiner*—Richard C. Queisser
*Assistant Examiner*—Joseph W. Roskos
*Attorney, Agent, or Firm*—Diller, Brown, Ramik & Wight

[57] ABSTRACT

An apparatus and method for processing or treating and simultaneously testing individual articles for conformance to predetermined standards or tolerances, and for rejecting articles failing to meet such standards.

The apparatus is typically embodied in a combination curler and tester for jar caps, and is adapted to receive a partially finished jar cap and impart a curl to the skirt portion thereof while simultaneously performing plural tests to determine that the curl is properly formed and that the gasket forming material is present in the configuration and amount necessary to prevent cap leakage. The apparatus includes a novel testing head assembly in which the position of a relatively movable detector element serves to control the flow of certain of the air used in testing, the testing head also including portions adapted to engage adjacent portions of properly formed caps to define a leak-tight air chamber and thereby to create a detectable air back pressure. Since air flow in the testing head is used to control air flow in an associated logic circuit, the decision of the circuit to accept or reject a cap is brought about in direct response to the condition of the cap being tested. The method includes detecting the condition of certain portions of the articles to be tested, and using the detecting means to control directly the air used within the associated fluidic logic circuit.

62 Claims, 12 Drawing Figures

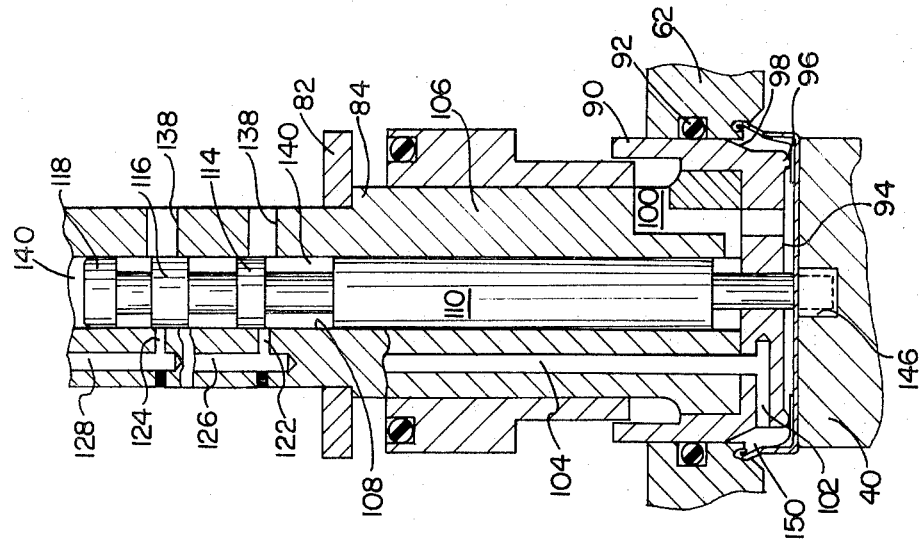
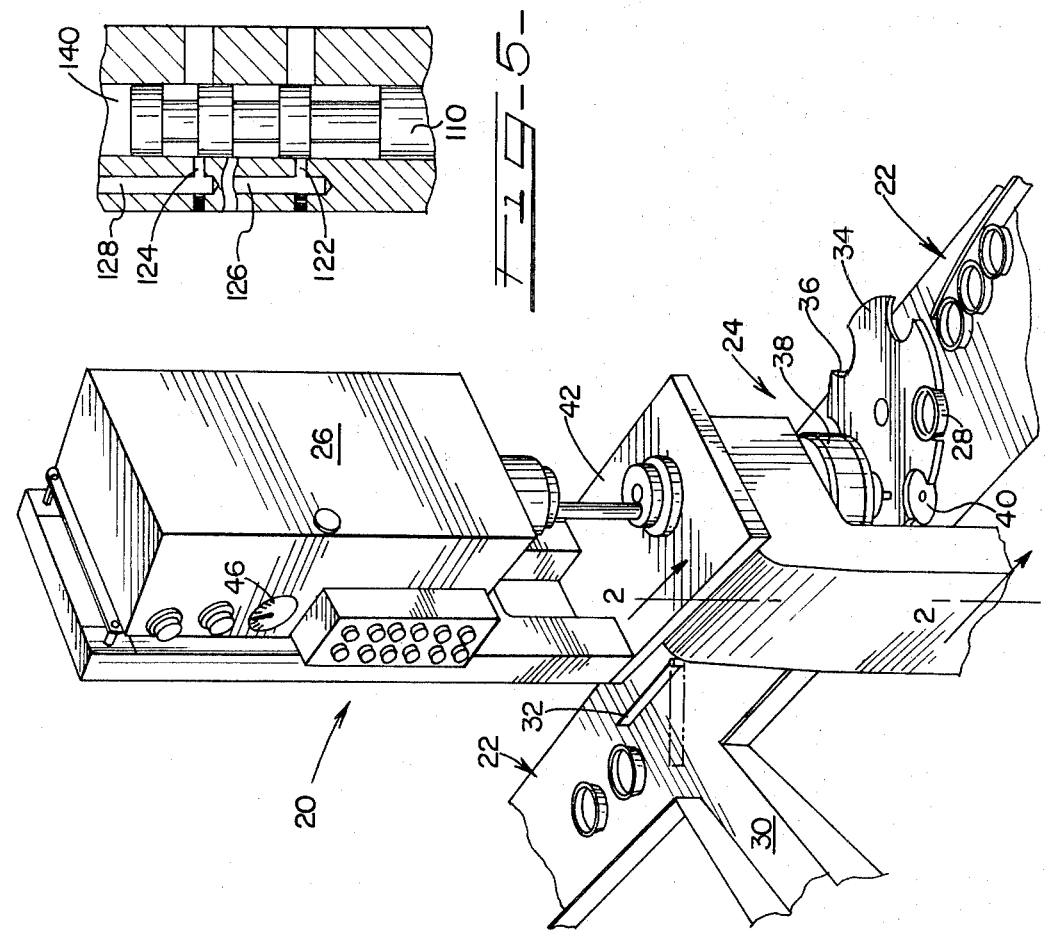

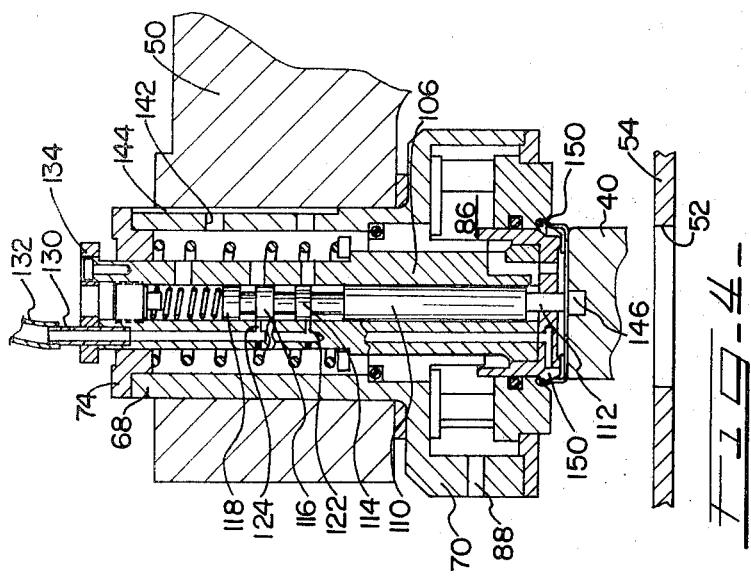
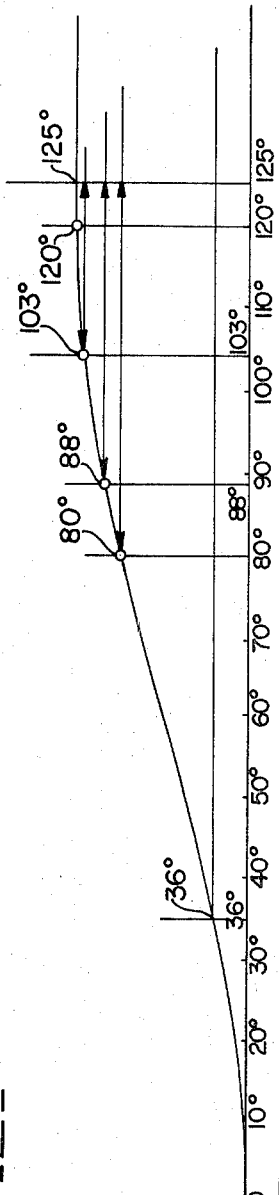
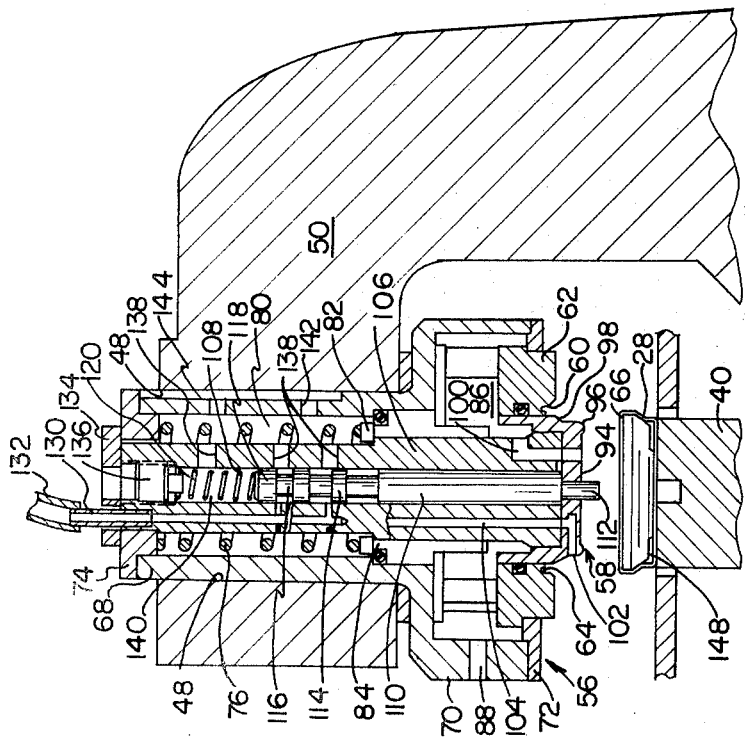
FIG-4-
FIG-2-
FIG-7-

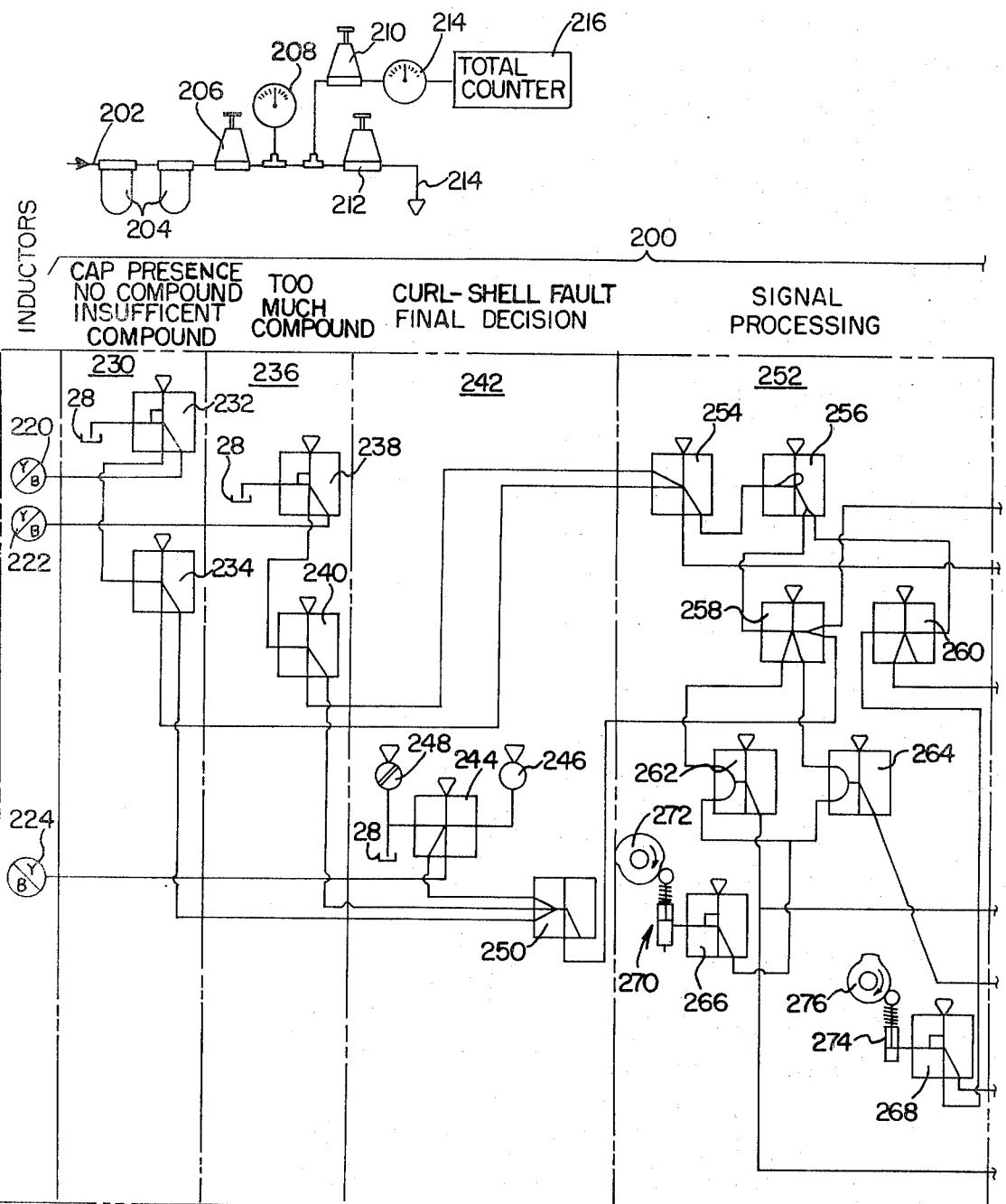
FIG-8A-
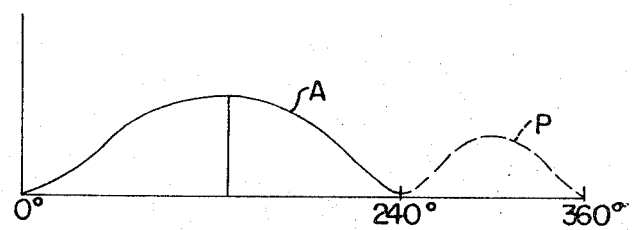
FIG-6-

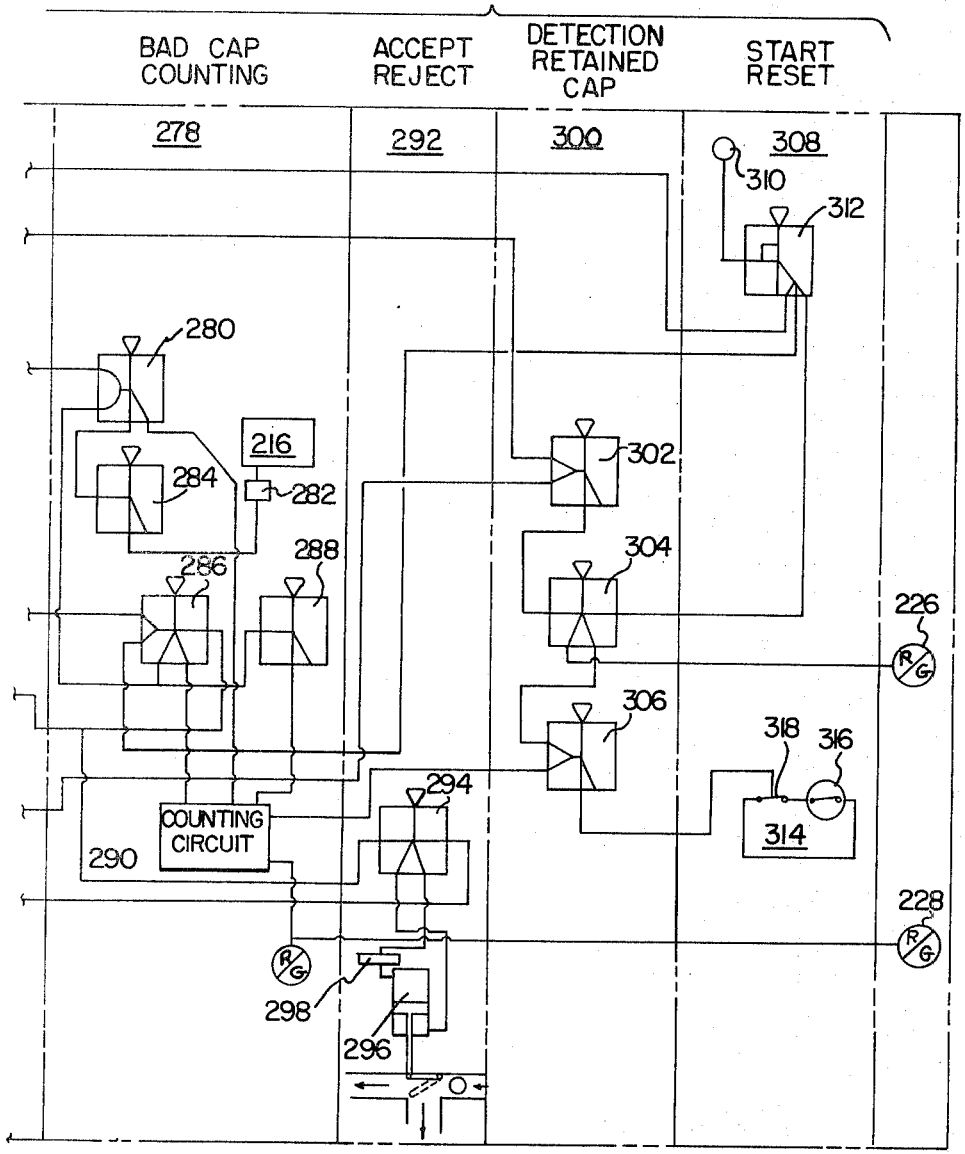
FIG_8B
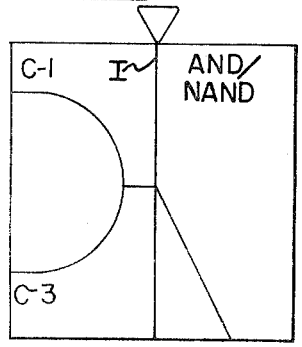
FIG_8C
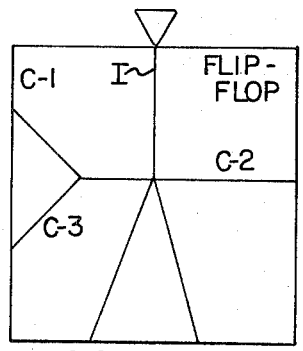
FIG_8D
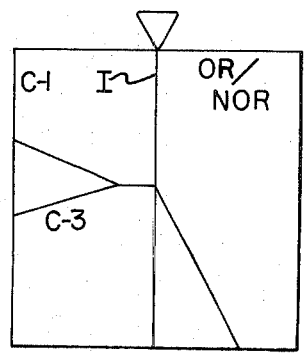
FIG_8E

APPARATUS AND METHOD FOR PROCESSING AND TESTING MANUFACTURED ARTICLES

BACKGROUND OF THE INVENTION

The present invention relates generally to a testing apparatus and method, and, more particularly, to an apparatus which simultaneously performs an operation on a given article and simultaneously tests the article, utilizing air as the test medium and making the decision to accept or reject the article in an associated fluidic logic circuit, the flow of air in the logic circuit being controlled directly by the air flow or air conditions used in the test.

The embodiment of the apparatus described in detail is used for imparting a finishing curl to the skirt portion of a succession of jar or bottle caps and simultaneously testing such cap to determine that the curl portion is properly formed, that gasket forming material is deposited within the cap, that the material is of proper thickness, and is free from defects which would ultimately cause leakage from the container with which the cap is associated in use.

In addition to the foregoing, the preferred form of apparatus includes means for determining whether or not a cap or other unit part is in position within the apparatus for testing, whether the part has been properly removed after curling and testing, and whether caps in a consecutive series or sequence of predetermined extent suffer from one or more flaws.

The apparatus may test an article with or without simultaneous performance thereon of an operation such as skirt curling or other operation, and may use a testing head having a fully contoured profile for forming one or more chambers between portions of the head and the article, with the chambers being air tight if the article conforms to one or more points of a specified dimensional standard or profile. In such a case, air flow control may be achieved solely by forming air tight chambers between several portions of the tester and the jar cap, can end or other part.

Furthermore, the unit may detect dimensional variations by movement of a detector stem unit which is positionable in response to the profile of the part; the tester may also use both of these principles in combination. However, for purposes of illustration only, the invention is described as being embodied in a unit having three basic elements, namely, an otherwise somewhat conventional curler for jar caps or can ends, a novel tester head assembly which includes a positionable valve spool, and a fluidic logic circuit controlled by conditions in the testing head and deciding according to preset criteria whether to accept or reject finished articles or pieces. The relatively movable detector in the head assembly is positioned by engagement with the articles being tested, and controls air flow in response to its position. Presence or absence of back pressure in various portions of the tester is detected by the logic circuit and used to control processing.

As described, the machine will perform a test function only when caps are present to be tested, and will stop machine operation if a predetermined number of faulty caps in succession are encountered. Moreover, the preferred form of apparatus includes means for keeping a running count of faulty caps encountered thereby, and for displaying such count to an operator as well as indicating the condition of various elements of the apparatus during use.

One principal feature of the invention is that since logic and memory components are of the fluidic type, the apparatus may use the same air which is used in testing to perform the process of making a decision whether to accept or reject a particular cap. In a typical form of the curler and tester, air under slight pressure is directed ($a$) to a portion of the interior of the cap in a chamber formed between portions of the cap skirt and the novel testing head, and ($b$) to a pair of passages within the head wherein air flow control is achieved by a movable detector element having an end portion adapted to contact a portion of the cap and thereby to assume a given position within the head. The use of fluidic modules provides simplicity, low cost, reliability, extremely high speed potential, freedom from interference by electrical or mechanical noise or shock, lack of wear, and other important advantages, some of which are referred to specifically herein and other of which are inherent in the operation of the apparatus and are well known to those skilled in the art.

In the prior art, testing of articles produced in enormous numbers, such as jar caps and the like, was usually carried, if at all, on the basis of a random dimensional inspection of a predetermined percentage of finished articles, after the production process was completed.

However, as in any quality control operation wherein 100% testing is not carried out, at least some faulty articles are likely to escape detection, not only if the faults are occasioned by random or unpredictable factors. Moreover, there is also the possibility that a merely temporary fault in some processing step will create a sequence of faulty articles which may go undetected because the random sampling did not include the group containing such faulty articles. Today, the mass production industries, particularly those servicing the food industry, are faced with great potential liability for producing faulty products, not only by reason of consequential damages occasioned by food spoilage or the like, for example, but also because of the possibility of creating sickness or the like in the consumers of the product. On the other hand, where enormous quantities of articles are manufactured in operations such as those of making jar caps, labor and machine costs in making 100% inspections by prior known methods are considered economically prohibitive.

Accordingly, there has been a need for a testing apparatus and method which would be capable of reliably testing mass produced articles at high speeds and at low cost with inherently great reliability. Furthermore, there has been a need for a system of this type, particularly one capable of incorporation into or association with existing facilities and equipment without substantial change thereto.

Accordingly, in view of the drawbacks and shortcomings of prior art apparatus and methods for testing mass produced articles, it is an object of the present invention to provide an improved article testing apparatus and method.

A further object is to provide an apparatus having means for performing one or more testing operations on mass produced articles and to store information developed in the tests within a memory system for later use in operating an acceptance or rejection mechanism.

A still further object is to provide an apparatus adapted to perform one or more manufacturing operations on an article, and substantially simultaneously to test the article for conformance to predetermined quality control standards.

Another object is to provide an apparatus using the same medium not only to perform tests but to control the mechanism operating to reject faulty or inferior articles.

A further object is to provide an apparatus to provide a fluidic logic and decision making circuit for performing test functions and storing information to be developed for subsequent use.

A still further object is to provide an apparatus having plural fluidic modules or elements actuable in a predetermined sequence.

Another object is to provide an apparatus utilizing a novel form of testing head capable of making plural determinations of dimensions or the like in a single operation.

Another object is to provide an apparatus having a testing head with a fluid control in the form of a spool movably positioned within a portion thereof and also having passages in the head for a fluid medium, with fluid flow through the passages being controlled by spool movement.

Another object is to provide an apparatus having a tester unit which may be arranged so as to permit greater or less latitude from a predetermined standard in accepting or rejecting articles.

A still further object is to provide testing apparatus which is capable of testing the performance of a plurality of articles by subjecting them to conditions closely simulating actual conditions of use.

A further object is to provide a method of testing various articles, including jar caps or the like, for the presence, absence, and disposition of compound used to form a sealing gasket and for the presence of a curl in the skirt portion of the cap.

Another object is to provide a testing method wherein physical characteristics of a completed article are sensed by application thereto of fluid forces and wherein such forces are used to control a fluidic logic circuit operative to initiate rejection of faulty articles.

A further object of the invention is to provide a testing apparatus using air or other fluid as a test medium and not requiring interfacing or transducing means in order to be used with an associated logic and decision making circuit.

A still further object of the invention is to provide a testing apparatus having a logic circuit capable of controlling auxiliary or related functions such as unit counting, cumulative counting, counter resetting, machine stoppage, and other functions.

A still further object is to provide a tester unit inherently capable of reliable operation at speeds heretofore unable to be achieved.

Another object of the invention is to provide a testing apparatus which is unaffected by mechanical or electronic interference or shock, and which will not interfere with nearby mechanical, electrical or electronic equipment.

Another object of the invention is to provide a novel testing head which may be incorporated into an existing cap curler with minimum modification thereof.

Still another object of the invention is to provide a combination of a generally conventional curler unit with a novel testing head having a logic circuit controlled by the head unit.

Still another object is to provide an apparatus having a fluidic circuit which includes a plurality of individual fluidic modules arranged in a predetermined sequence and adapted to operate in a predetermined logical order to detect, in jar caps or the like, the presence or absence of gasket compound, whether such compound is present in an insufficient or excessive amount, whether the cap shell is properly curled, and whether a processed cap is still present in the transfer plate after the intended removal therefrom, all of such circuits being adapted for substantially instantaneous response, such circuit also having means for storing signals generated by the testing for a predetermined time, as well as means for counting rejected caps cumulatively and by groups.

The foregoing and other objects and advantages are carried out by providing an apparatus for use in association with a manufacturing line and which includes a testing head portion having fluid passages forming at least a part thereof, means responsive to the condition of an article to be tested to control the flow pattern of the fluid in the passages and thereby create detectable fluidic signals indicative of satisfactory and unsatisfactory parts, a fluidic logic circuit for differentiating between different forms of signals, and having means to cause rejection of parts in response to signals indicating that such parts are unsatisfactory. The objects are also achieved by a method which includes periodically generating signals of predetermined duration for use in a fluidic circuit which compares and analyzes signals for controlling finished article acceptance or rejection.

The manner in which these objects and advantages are carried out in practice will become more apparent when reference is made to the following detailed description of the preferred embodiments of the invention set forth by way of example and shown in the accompanying drawings, wherein like reference numbers indicate corresponding parts throughout.

BRIEF DESCRIPTION OF THE DRAWINGS

FIG. 1 is a perspective view, with portions broken away and partly diagrammatic in nature, showing one form of the cap curling and testing unit of the invention;

FIG. 2 is an enlarged fragmentary view showing the cap curling die, the tester assembly associated therewith, the supporting frame therefor and the anvil which reciprocates vertically to position the cap in relation to the curler and detector;

FIG. 3 is a further enlarged vertical sectional view of the curling die and tester assembly, showing the detector element in one position of use;

FIG. 4 is a view similar to FIG. 2 but showing an acceptable cap with the skirt portion curled and with the detector element reflecting the presence of an acceptable cap;

FIG. 5 is a fragmentary view of a portion of the tester assembly showing the detector in another possible position of use;

FIG. 6 is a timing diagram of one complete machine cycle, and showing anvil movement versus elapsed time in solid lines and turntable revolution versus time in broken lines;

FIG. 7 is a further enlarged view of the curve of FIG. 6, showing the time sequence of the testing operation in relation to the sequence of machine operation;

FIG. 8A is a schematic view of one portion of the air supply and fluidic logic and decision making circuit typically used in the apparatus of the invention;

FIG. 8B is a schematic view of the remaining portions of the fluidic logic and decision making circuit of FIG. 8A.

FIGS. 8C, 8D and 8E are enlarged schematic views of certain individual elements within the fluidic circuit forming a part of the invention.

DESCRIPTION OF THE PREFERRED EMBODIMENTS OF THE INVENTION

Before referring in detail to the preferred embodiments of the present invention, it will be understood that, whereas the principles of the invention may be applied in a number of environments and may be embodied in different machines and control systems, illustration thereof will be made with reference to an embodiment wherein the articles to be tested are jar or bottle caps, wherein the operation performed substantially simultaneously with testing includes forming a curl on the lower portion of the cap skirt, wherein the fluid medium is air, wherein several tests, including those relating to the cap shape and to the presence, the extent and the configuration of gasket forming compound are carried out by the detector, and wherein the test results are analyzed by the fluidic logic circuit for decision making purposes.

Referring now to the drawings in greater detail, FIG. 1 shows one form of the invention to be embodied in a combination cap curling and testing apparatus generally designated 20 and including means in the form of a belt or the like generally designated 22 for advancing a series of caps initially toward and subsequently away from a curling station generally designated 24 under the control of a fluidic type signal transfer and status judgment circuit 200 shown in detail in FIGS. 8A and 8B and shown in FIG. 1 to be incorporated into a cabinet generally designated 26. As shown in FIG. 1, caps 28 which proved defective are moved toward a chute 30 by a movable deflector element 32, while caps 28 passing the tests continue along the advancing means 22.

The curling station 24 includes a rotary plate 34 having a plurality of semicircular recesses or pockets 36, a combination curling and testing head generally designated 38, a cap supporting anvil 40 adapted for vertically reciprocating movement, and a flexible conduit 42 for directing a plurality of air tubes or lines to the cabinet 26. The cabinet 26 includes an array of signalling units, and may be suitably equipped with gauges 46 and like auxiliary controls and indicators of a well known type. Although the operation of the apparatus 20 will be described in greater detail elsewhere herein, it may be seen basically to include means for advancing a series of articles, such as caps, for positioning them individually within the wheel 34, for indexing them to a position above the anvil 40, for moving them into a position of engagement with the curling and testing head 38, and for thereafter moving them to a discharge area for storage or installation.

Referring now to FIG. 2, it will be noted that the curling and testing head assembly 38 is received within a bore 48 in the upper portion 50 of the frame of the apparatus 20. The assembly 38 is disposed directly above the top surface of the reciprocable anvil 40 which is adapted for vertical movement through an opening 52 in the table 54 across which the caps 28 pass for treatment and testing. The curling and testing head assembly 38 is shown in FIGS. 2–5 to include an outer centering plunger assembly generally designated 56 and an inner centering plunger assembly generally designated 58.

The outer assembly 56 includes a beveled annular wall portion 60 forming a part of a ring with an annular curling groove 64 located radially inwardly of the beveled wall 60 for receiving the lowermost edge portion 66 of a cap 28 and imparting a curl thereto. The upper portion of the outer centering plunger 66 includes a sleeve 68 which is pressed into the bore 48 in the frame 50. An enlarged diameter sleeve 70 and an annular radial flange 72 attach the sleeve 68 to the ring 62, thereby preventing axial movement of the entire outer centering plunger assembly 56. A cover unit 74 closes off the top portion of the sleeve 68 and serves as a base for a coil spring 76 disposed within a chamber 80 between the outer and inner assemblies 56, 58. The lowermost portion of the spring 76 rests on a collar 82 received on a shoulder portion 84 of the inner centering plunger assembly 58. A chamber 86 formed between the lower portion of the assemblies 56, 58 is vented to the atmosphere by a passage 88 to permit the assemblies 56, 58 to reciprocate with respect to each other without causing a vacuum or compression of air within the chamber 86.

The inner centering plunger assembly 58 is adapted to reciprocate with respect to the outer assembly 56 and includes an annular surface 90 (FIG. 3) which slides within the ring 62 and is sealed thereagainst by an O-ring 92 or the like. The inner centering plunger 58 also includes a lower surface portion 94, an annular shoulder 96, a beveled surface 98, and an axially and radially extending vent 100 which communicates with the chamber 86 and hence with the atmosphere. Moreover, a radially extending port 102 is provided axially inwardly of the shoulder 96 which communicates with an axial passage 104 in the shank portion 106 of the inner centering plunger assembly 58. The shank portion 106 in turn includes a smooth axial bore 108 in which are received a movable detector spool 110 having a reduced diameter nose portion 112, a pair of lands 114, 116 and an enlarged end portion 118 against which is disposed a compressible coil spring 120. Axial movement of the spool 110 causes the lands 114, 116 to cover or uncover a pair of radial ports 122, 124 which communicate respectively with separate axial passages 126, 128. Inasmuch as portions of the shank 106 are shown broken away in the vicinity of the axial passages 104, 126 and 128, it will be understood that these bores are actually spaced apart from each other about the circumference of the shank 106, preferably 120° apart, and that each is equipped with a fitting 130 (one only shown) to which a flexible hose 132 is attached in fluid-tight relation.

An inner plunger end cap 134 surmounting the outer plunger end cap 74 serves to hold a spacer or spring base unit 136 for the spring 120 in position within the bore 108.

Three radial ports 138 in the shank 106 permit flow of air from the chamber 140 inside the bore 108 to the chamber 80 inside the sleeve 68, and thence through the radial ports 142 into a milled slot or like passage 144 in the sleeve 68 and hence to the atmosphere. Accordingly, air can pass from the lines 132 through either of the passages 128, 126 through the ports 122, 124 and ultimately into the atmosphere, provided the ports 122, 124 are not closed by lands 114, 116 of the spool 110. The uppermost port 138 prevents an air lock behind the enlarged end portion 118 of the spool 110 and permits the spool 110 to move without compression or rarefaction of air.

Referring now particularly to FIGS. 2 and 3, it will be noted that a recess 146 is provided in an end face of the anvil 40 so that in the event a cap 28 is not resting on the anvil 40, the detector spool 110 will remain in the position of FIG. 2 relative to the inner centering plunger 58, even if the anvil 40 is raised.

From the foregoing description, it will be apparent that, in the use of the apparatus, the anvil reciprocates vertically, carrying with it a cap 28, and, in so doing, first causes the detector spool 110 to rise somewhat. Next, engagement is made between the edge 56 of the cap 28 and the beveled surface 60 of the groove 64. Further upward movement of the anvil 40 curls the edge 66 of the skirt portion of the cap 28 and thereby somewhat reduces its overall height, causing the spool 110 to be raised further and causing the shoulder 96 to contact the compound 148 in the cap 28. The foregoing action also causes relative upward motion of the inner centering plunger assembly 58 relative to the outer centering plunger assembly 56, against the downward pressure of the spring 76. In the case of a satisfactory cap, this ultimately moves plungers 56, 58 and the detector spool 110 to the position of FIG. 4.

In this position, it will be seen that an annular chamber 150 is formed between the annular gasket 148 of the cap 28, the skirt of the cap 28 and the two centering plungers 56, 58. Air may be supplied to the chamber 150 through the port 102 at the end of the axial passage 104, and if the chamber 150 is air tight, a sensible back pressure will be developed in passage 104. Moreover, the two lands 114, 116 close the ports 122, 124, insuring that back pressure can also be developed in passages 126, 128. On the other hand, leakage through any one or more of the ports 102, 122, 124 will occur if the caps 28 have one or more flaws.

For example, in the event the compound forming the annular gasket 148 includes discontinuities, voids, pock marks, or, even though continuous, is of varying axial depth, air will leak beneath the shoulder 96 from chamber 150 and ultimately out the passage 100. Consequently, a gasket which is faulty in this sense makes it impossible to maintain a back pressure of a constant value for a finite duration in passage 104. Likewise, if the curl on the margin 66 of the cap skirt is improperly formed, it will not form an air tight seal with the metal groove 64, and air leakage will also result, with the same consequences.

The use of a combination curling and testing head having these capabilities is an important feature of the invention because the test carried out thereby is functional in nature while being nondestructive; that is, it duplicates conditions of installation rather than measuring other parameters. Thus, the test is concerned directly with the fact of whether or not the cap will leak rather than with the measurement of a less direct property of the cap, such as a dimension or the like.

In the event no cap is present to engage the nose portion 112 of the detector spool 110 to raise the spool above the position thereof shown in FIG. 2, leakage will occur at least through port 122 and thence into chambers 140 and 90 through ports 138 and 142. This condition will make it impossible to establish or maintain a sensible back pressure for any duration in passage 126, for example. Furthermore, if no gasket forming compound is present, or less than a predetermined amount thereof is present, the shoulder 96 is closely spaced apart from the top panel of the cap 28, causing the detector spool 110 to assume a relatively higher position than is desired. This condition, which is shown in FIG. 3, also permits leakage through port 122 and hence makes maintenance of back pressure in passage 126 impossible.

If excess compound is present, conditions are the opposite, that is, the spool rides too low in the shank 106, thereby uncovering port 124 and permitting air to escape through port 128, and making it impossible to maintain a back pressure in passage 128. The amount of variation in compound thickness which is permissible is varied by changing the configuration of the spool, or, more commonly, by adjusting the back pressure response characteristics of the fluidic circuit, as will be set forth more fully herein.

From the foregoing description, it will be apparent that each complete machine operating cycle involves raising of the inner centering plunger 58 in its entirety from the position of FIG. 2 to the position of FIG. 4, and permitting the assembly 58 to return to the position of FIG. 2. Accordingly, the lines 132 are preferably made of a highly flexible plastic or rubber tubing, and a number of these lines are encased within the flexible conduit 42, (FIG. 1).

Referring now particularly to FIG. 6, a timing diagram of the operation of the apparatus is diagrammatically shown. The solid line portion of the curve of FIG. 6 is designated A and represents anvil movement. The broken line portion is designated P and represents movement of the plate 34. During one complete 360° cycle of machine operation, the anvil 40 moves at first upwardly reaching its apex at about 120°, and thereafter moves downwardly, terminating its downward motion at about 240°. The rotary recessed plate 34 does not move during all or virtually all of the time when the anvil 40 is being moved through its cycle, but begins movement at about 240°, just as the anvil 40 stops movement; the last 120° of the machine operating cycle includes movement of the plate 34 only. Thus, for purposes of the present description, a complete machine cycle consists of movement whereby the anvil raises the cap 28 to a position first adjacent and then into intimate contact with the curling head and the detector mechanism 38, then lowers the cap 28 to a position flush with the table 54 and thereafter remains immobile while the plate 34 is rotated such that the just-processed cap is released and a to-be-processed cap has been moved from a stationary or pickup position to a position just overlying the anvil.

Thus, assuming the plate 34 to have six pockets 36, six cycles of machine operation would be required for every complete revolution of the plate 34; that is, one cap would be completely processed during the time the plate 34 is indexed through a 60° arc and then stops while the cap is raised, curled, tested and lowered.

FIG. 7 is more detailed than FIG. 8 and shows graphically that testing occurs only during a minor portion of a machine operating cycle. For example, a plurality of vertical intercepts are shown at various points marked 36°, 80°, 88°, 103°, 120° and 125°.

Referring now to the significance of these marks, the vertical line at 36° indicates that at this point, the anvil 40 has raised sufficiently to contact the cap and begin to raise it from the table 54. At the 80° portion of the cycle, the nose 112 of the detector spool 110 has engaged the inner portion of the cap 28 and the spool 110 has been raised sufficiently so that land 114 has at least begun to close the radial port 122, causing sensible back pressure in passage 126. At the next marked intercept, 88°, port 122 has remained closed and radial port 124 has become fully or nearly fully closed off by land 116. In this connection, it will be seen by reference to FIG. 4, for example, that since port 124 is closed by the uppermost portion of the land 116 while port 122 is closed by the lowermost portion of land 114, vertical upward movement of the spool 110 will close radial port 122 well before port 124 is closed, and that both will be closed simultaneously only for a short time.

By "closed" as used herein is meant closure of any predetermined amount of the port which will serve to create a sensible back pressure. That is, it will be understood that both ports will not always be exactly fully closed, but that the sensitivity of the system may be adjusted so that the port will be considered closed when, for example, 75 percent or more of its area is closed off.

During the portion of the cycle from 80° to 88°, the detector spool 110 is being moved vertically by compression of the relatively low force coil spring 120; axial force is applied to the spool 110 and will not cause the inner centering plunger 58 to move with respect to the outer centering plunger assembly 56. However, when the anvil 40 raises the cap into contact with the inner centering plunger, further anvil movement moves the plunger assembly 58 relative to the assembly 56. At the 103° point in the cycle, the skirt of the cap 28 has reached the curling groove 102 in the curling die and is beginning to be curled, forming an air tight seal with the ring 62. From 103° to 125° in the cycle, the cap is fully curled, and may be tested by air fed through passage 104 into chamber 150.

Since cap detection is initiated at the 80° portion of the cycle, but curling commences only at the 103° mark, it will be apparent that the length of time available to test for the presence of the cap and for determination of compound thickness is relatively extended in relation to the time available to test for improper or uneven compound and for faults in the curl portion in the cap. Assuming however that at typical operation speeds, the shortest test period is 15 milliseconds or more, and assuming that fluidic circuit response time is as little as 10 milliseconds, it will be seen that the operational speed of the detector is still limited by the cap feeding speeds rather than detection response times. 9

Referring now only generally to FIG. 8A and 8B, there is shown a schematic illustration of the fluidic logic and control system used in the invention, showing the components or modules arranged in groups beneath legends indicating the functions performed by the units. Each of the modules or component parts of the apparatus is illustrated in a standard form well known to those skilled in the art; however, for simplicity, the characterisitics of each module will be summarized before the circuit as a whole is described.

In all modules, which are shown as blocks, the input or pressure supply port is shown at the top of each module, the pressure outputs are shown at the bottom of each module, and the control inputs are shown at one or both sides of the blocks. These control inputs are designated by a "C" followed by a number; the odd number ports enter from the left, e.g. C-1, C-3, etc., and the even number ports from the right, e.g., C-2, C-4, etc. In monostable devices, the output pressure of the device in the stable or inactive state is shown schematically to pass to a first pressure output port (sometimes herein referred to as the 0-2 port) shown directly beneath the pressure input port and connected thereto by a passage shown as a vertical line. The output of the device in the alternate or activated state is through a second port (sometimes herein referred to as the 0-1 port) which is shown as being offset from the first port; the passage to this port is shown by an inclined line. The arbitrary numbering of the ports as odd or even numbered ports is conventional only, but the purpose thereof will presently appear.

In schematic illustration of bistable devices, no straight through passage lines are shown, thus implying that there is no preferred state for such devices. Such units are conventionally called "flip-flops" and may be "unpreferenced" or "preferenced," the preferenced flip-flop differing from its counterpart only in that its initial output state is always the same. In use, however, it will remain in the state to which it is switched unless and until a subsequent, opposite control signal is applied. In these units also, left side control inputs are oddly numbered, right side output ports oddly numbered, and vice versa.

In addition to the general types of fluidic modules referred to above, symbols are also shown in FIGS. 8A and 8B for the Schmitt trigger unit, the back pressure switch and the one-shot multivibrator, all of which are referred to in greater detail elsewhere herein.

Referring now to certain of the monostable devices, the OR/NOR gate is one having a single stable state and at least two left hand or odd-numbered control inputs. Control pressure applied to any one or more of the several odd-numbered inputs switches the pressure output to the second or odd-numbered output port. If neither control input is present ("not OR"), the device reverts to the stable state wherein pressure output appears at the first or even-numbered output port.

The AND/NAND gate is characterized by the requirement that switching to the odd-numbered (0-1) port occurs only when both first and second odd-numbered control inputs are present. Normal or straight-through output to the even-numbered (0-2) output port occurs if both control inputs are not conjunctively (NAND) present. The pressure of either control input along therefore does not serve to switch the device away from the stable state.

An INHIBITED OR gate is the same in function as the OR/NOR gate except that an additional or third, even-numbered control input is able to inhibit the OR function as long as the even-numbered or INHIBIT input is present. Thus, without the INHIBIT control input, the OR gate function is provided, while a pressure at the INHIBIT input prevents any other control pressure from acting on the device to switch if from the stable or 0-2 output state.

The flip-flop units are bistable devices, and therefore are capable of retaining a position previously dictated by a control signal; such units have "memory." The preferenced flip-flop is one having a predetermined initial state so that its initial or start-up condition will not be random. However, in use, it is identical to the normal fluidic flip-flop or fluidic bisable amplifier. As in the other devices, the odd-numbered control signal input switches the device output to the odd-numbered pressure port, and vice versa.

The port numbering system is illustrated schematically in FIGS. 8C-8E. For example, FIG. 8C shows an AND/NAND gate having two left-hand, even numbered control inputs C-1 and C-3. Output ports are 0-2 and 0-1; since the odd numbered output port 0-1 is to the right of the 0-2 output port, the symbol schematically indicates that when pressure is present both at C-1 and C-3 the fluid flow will be forced from left to right as shown in FIG. 8C, that is, from 0-2 to 0-1; in this way, it will be seen an odd numbered control signal results in an odd numbered output.

FIG. 8D shows a flip-flop wherein the left-hand control inputs C-1 and C-3 are odd numbered and the right-hand control input C-2 is even numbered. Although this device does not have one stable state, it will still be noted that forces applied from the direction of an odd numbered control port will create an output in an odd numbered output port, and that control forces coming from the even numbered port will cause output flow in the even numbered port. In a typical flip-flop, two or more even control ports might also be provided.

FIG. 8E shows an OR/NOR gate having a steady output state at 0-2 and an odd-numbered 0-1 output port, with a pair of odd numbered control ports C-1 and C-3 being provided at the left. Once again, the convention is present whereby a signal present at the left or odd numbered position will schematically be seen to deflect the fluid stream ordinarily passing straight through the device towards the right; since the device of FIG. 8E is an OR/NOR gate, if a signal is present in either C-1 or C-3, output will appear at 0-1, if at neither, the pressure from input line I will appear at port 0-2.

A "staged" combination of two bistable amplifiers, one to "decide" that a signal has been received and the other to "memorize" the signal, acts as a binary counter. These units may be used to display a cumulative count, as will appear elsewhere herein.

Another common fluidic device is the Schmitt trigger, which is basically a pressure sensitive switch differing from others in that it is extremely sensitive, in that the set-point or threshold may be adjusted, and in that it is characterized by narrow switching bandwidth or narrow hysteresis, meaning that the difference between the signal required to turn on a given output when the input signal is increasing is very little different from the signal required to turn the same output off when the input signal is decreasing in strength. The symbol for the Schmitt trigger is similar to that of an OR gate except that it has a single control input on each side, and the second output port is shown to the left of the center port rather than to the right thereof. However, pressure from the odd (C-1) control will switch the device to the odd (0-1) output, and likewise for the C-2 input and the 0-2 output.

The back pressure switch is similar to an OR gate except that it uses a single control input corresponding to C-1, but often merely referred to as "S". The symbol shows a restricted connection between the supply and the control port. In use, the control port is vented or unpressurized so as to exhaust air freely therefrom, permitting straight-through passage of output pressure air. If the control port is blocked, air from the pressure passage is directed into the control input passage, thereby switching the output to the odd-numbered port.

A one-shot multivibrator schematically resembles an OR gate except that a loop is shown extending from the junction of the two output passages to the pressure inlet passage and also to the control port passage. In use, the multivibrator produces an output in the odd-numbered port when a control signal is applied through the odd-numbered control port. However, the maximum duration of the output at the second control port is predetermined (10 milliseconds, for example) and the output duration is the lesser of such predetermined time or the duration of the control pulse, whichever is shorter; in no case it is longer than such predetermined time, regardless of control pulse duration.

In various arrays of all the foregoing devices, the output of each module is shown to be fed to a control input of another logic module, or to another fluidic amplifier, or to any other device for indicating the existence of a given condition or for bringing about a reaction in the associated machine. Thus, connecting lines, for purposes of simplicity, are not always numbered individually, but are referred to by the conventional numbers explained above as they exist from a pressure port, or enter a control port, etc.

Referring again to FIGS. 8A and 8B, and to the layout of the various elements of the fluidic circuit 200, a schematic representation of an air supply for the apparatus of the invention is shown to include an inlet supply line 202, which receives compressed air, typically at 60 to 80 psi. A pair of filters 204 of a known type are disposed in series in the inlet line 202, and provide a filtration level of 10 microns or less, preferably excluding particles of 3 to 5 microns and larger. A first pressure regulator 206 provides an intermediate supply pressure, which may be indicated on gauge 208. Downstream of the gauge 208 are disposed in parallel an additional pair of regulators 210, 212, with a manometer 214 indicating the pressure maintained in the total counter portion of the circuit 216, regulator 212 being adjusted to provide an operating supply pressure of 3 to 10 psi for the fluidic circuit.

The pressure in line 214, which is preferably about 5 psi, is supplied to each of the individual modules referred to below and, minus slight losses in the line, serves as the pressure input of each fluidic module, pressure output being only slightly reduced in relation thereto. The fluidic air pressure fed to the control ports of the individual modules is often substantially reduced in relation thereto, some elements being capable of responding to control pressures of as little as 5 percent to 10 percent of the input pressure. Typically, most modules use a control port pressure of around 10 to 20 percent of the input port pressure and normally a pressure not to exceed 30 percent of the input port pressure.

Referring now to the remainder of FIGS. 8A and 8B, it will be noted that the fluidic devices are arranged in a series of groups separated from one another by block lines, and that each area defined by a pair of block lines bears a title at the top thereof indicating the nature of operations performed in that particular portion of the circuit.

Thus, the indicator section at the extreme left of FIG. 8A shows a plurality of indicators 220, 222, 224, the representation thereof indicating that these indicators switch back and forth in use between display of a yellow and a black color, with the black signal indicating the presence of a good or acceptable cap. These indicators are normally biased by extremely light but quick-responding springs to the yellow or "Bad Cap" indicating signal, but can be switched in an extremely short time, such as 1 to 5 milliseconds or less, back to indicate the black condition. The portion at the extreme righthand side of FIG. 8B also shows a pair of red-green indicators, with these indicators arranged in a similar manner except that the indicator 226 indicates a green condition during normal use of the machine and the indicator 228 also normally indicates a green condition. The indicator 228 shows a red condition after a preset number of consecutive faulty caps are detected, as will appear later, while the indicator, 226 merely shows normal machine operation from time to time.

Referring now to the portion of FIG. 8A just to the right of the indicator portion, this section is entitled "Cap Presence-No Compound-Insufficient Compound" and is numbered 230. This section 230 includes a back pressure switch module 232 and an OR/NOR gate 234, with connections thereto which will be referred to later. It will be noted that an individual cap unit 28 is schematically shown to be present and that one control line extends between the cap 28 and the back pressure switch 232. Referring to the next section, this area is entitled "Too Much Compound" and is numbered 236. This section includes a back pressure switch 238 and an OR/NOR gate 240, and also schematically illustrates a functional connection between the back pressure switch 238 and the cap 28.

The next section is numbered 242 and is entitled "Curl-Shell Fault-Final Decision." Section 242 is shown to include a Schmitt trigger 244, a bias air supply 246, a needle valve or sensitivity adjustment 248, and an OR/NOR gate 250, and shows the portion of the control circuit served by the needle valve 248 to include the cap 28.

The next section is numbered 252 and is entitled "Signal Processing." The signal processing section 252 includes an OR/NOR gate 254, a one-shot multivibrator 256, a pair of flip-flops 258, 260, a "Good Cap" AND gate 262 and a "Bad Cap" AND gate 264, and a pair of back-pressure sensitive switches 266, 268. Associated with the back pressure switch 266 is a vented piston and cylinder assembly 270 which is spring biased so as to provide no back pressure in the normal condition, and which includes an actuating cam 272 having approximately a 180° lift duration. As shown, the cam 272 will move the piston within the assembly 270 so as to develop back pressure during approximately 180° of cam rotation.

Similarly, back pressure switch 268 includes a back pressure piston and cylinder assembly 274 and an associated cam 276 for operation thereof. However, the arrangement of the parts 274, 276 is somewhat different from that of the assembly 270, in that the piston within the assembly 274 normally blocks the control passage of the switch 268, furnishing back pressure except when the cam lobe actuates the piston. This cam is shown to have approximately a 40° lift duration and is preferably timed to actuate the piston within the assembly 274 from 170° to 210° of machine rotation, for purposes which will presently appear.

Referring now to FIG. 8B, the left hand portion thereof shows a section numbered 278 and is entitled "Bad Cap Counting." This section includes an AND gate 280, an exterior display total counter of the "Hecon" type and is numbered 216, it being understood that this is the same counter shown in association with the power supply schematically illustrated at the top of FIG. 8A. A fluidic amplifier designated 282 is shown to be associated with this counter. Associated with the AND gate 280 is an INHIBITED OR gate 284. Furthermore, the section 278 also includes a flip-flop 286, an INHIBITED OR gate 288, and a counting circuit 290.

The next section is entitled "Accept-Reject" and is numbered 292. This section is shown to include a flip-flop 294, a pneumatically operated rejector assembly 296, and a fluidic amplifier 298. The next section, numbered 300, is entitled "Detection-Retained Cap" and is shown to include an INHIBITED OR gate 302, a preferenced flip-flop 304, and an INHIBITED OR gate 306. The last section of FIG. 8B is designated 308 and entitled "Start-Reset." This section includes a push button 310, and a back pressure switch 312 operatively associated therewith, it being understood that the back pressure switch has plural outlet ports in the 0-1 or responsive state position. The section 308 also includes a main on-off switch 314 which is shown to have a manual switch portion 316 and a portion 318 responsive to conditions within the fluidic logic circuit.

Before referring in detail to the operation of the circuit 200 just described, certain of the general principles applicable thereto will first be set forth. Initially, it should be understood that, since the apparatus is normally used at a processing and testing rate of 200 or more units per minute, the actual number of units passing through a single device in a typical production day is extremely large, of the order of 200,000 or more units per multiple shift day. Therefore, no attempt is made to count all caps or other processed articles having passed through the apparatus of the invention, since these total figures are more easily kept in conjunction with other manufacturing operations. However, the counting circuit 290 is adapted to turn off the machine when any predetermined consecutive number of bad caps enter the machine; this number is commonly 10. Moreover, the cumulative number of defective caps is separately counted and it is this number which appears on the display portion of the total counter 216.

The other basic principle of operation is that all of the caps or other articles processed are assumed to be defective unless they pass all of the "good" tests carried out by the apparatus, and accordingly, the apparatus is of a "fail-safe" type or nature.

Referring again to FIGS. 8A and 8B, and in particular to the logic circuit 200 contained therein, a brief description of the operation of the circuit wilo now be set forth. Assuming that a cap 28 is disposed within the curling die, and that testing for cap presence is initiated at approximately the 80° portion of the machine operating cycle, (FIG. 7) the spool 110 within the inner centering plunger assembly 58 will be moved to the position of FIG. 4, that is, the spool 110 will be raised because a cap is present, and assuming sufficient compound also to be present, both lands 114, 116 will block off radial ports 122, 124. Thus, the back pressure switch 232 will detect back pressure in the C-1 or control port, temporarily switching air flow to the 0-1 output port which, being connected by a suitable line to indicator 220, will cause the indicator to show black, indicating the presence of a good cap. Consequently, during this time, no control signal will appear at the OR/NOR gate 234, since fluid flow will be in the line feeding the indicator 220 instead.

Assuming next that the cap 28 does not have too much compound, which is sensed by elements within region 236, sufficient back pressure will be present in passage 128 to be detected by the back pressure switch 238, causing it to furnish an output in the 0-1 port thereof. This will cause the second indicator 222 to indicate black during the pulse duration, and no signal will be furnished during this time to the control port of the OR gate 240. Consequently, pressurized air will pass through the port 240 and be fed to the C-1 control input of the OR/NOR gate 254. It may be noted that the output of OR/NOR gate 234, passing directly through to the 0-2 port will also be fed to the other or C-3 control port of the OR/NOR gate 254 in the signal processing portion 252 of the circuit.

The need for an OR/NOR gate may be appreciated when it is understood that back pressure will not be initially detected simultaneously by switches 236, 238; switch 232 will be actuated first. The third test sequence is for faults in the curl, or in other portions of the shell that would cause improper seating thereof within the curling die, and for any discontinuities in the gasket material itself which would permit radial air flow from chamber 150. In this so-called final decision section 242, a predetermined pressure level is set to the C-2 or right side control port by adjustment of the bias regulator 246 serving the Schmitt trigger 244. The needle valve 248 is also set to a predetermined adjustment, and air flowing therethrough passes to the chamber 150 formed between cap 28 and the curling die. If a predetermined amount of back pressure develops, it will be fed to the left or odd numbered control port in the Schmitt trigger 244, overcoming the bias furnished by the regulated source 246. Accordingly, a good cap will provide sufficient back pressure to the Schmitt trigger to cause pressure fluid flow in the 0-1 output port which is connected by a suitable line to the third signal indicator 224; this indicator will also index to the black position, showing the presence of a good cap. Referring now to the OR/NOR module 250, it will be noted that assuming the cap to pass all three tests, no signal is furnished to this module during the time testing is taking place. This is because the output of OR/NOR gate 234 is fed from the 0-2 port to the gate 254, because the output of OR/NOR gate 240 is likewise fed from the 0-2 port to the OR/NOR gate 254, and because the 0-2 output of the Schmitt trigger is also not present at a left hand control port of the gate 250. Therefore, if the cap passes all of the three tests indicated above, no signal will appear at any one of the control inputs of the OR/NOR gate 250, the pressure will continue to pass out the 0-2 port, and from there, it will be fed to the C-4 port of the flip-flop 258.

Referring again to the area 252, wherein the fluidic signals are processed, it will be noted that in the case of a good cap, the gate 254 is biased to the 0-1 output space as soon as either or both of the signals coming from areas 230 and 236 are received. The 0-1 output, as shown, feeds the one shot multivibrator 256, which in the preferred form, furnishes a 10 millisecond output pulse at both 0-1 ports thereof, one port feeding the C-1 input of the flip-flop 258 and the other feeding the right hand or C-2 control port of the flip-flop 260. Accordingly, assuming that the multivibrator 256 is actuated before the signal from the OR/NOR gate 250 is received by the flip-flop 258, the flip-flop 258 will first be switched to the 0-1 output and then rapidly back to the 0-2 output as a signal appears in the line connecting flip-flop 258 to the OR/NOR gate 250.

Accordingly, since the one shot multivibrator signal is of limited duration, the output of flip-flop 258 comes from the 0-2 port thereof, from which a signal is applied to one control port (C-1) of the so-called Good Cap AND gate 262. The other control port (C-3) of the AND gate 262 is seen to be served by a branched line which receives a signal from the back pressure switch 266 when the cam 272 causes the assembly 270 to become closed. Thus, the cam 272 causes back pressure to appear in the line serving the C-3 port of gate 262 at a predetermined time in the operational cycle, causing a signal to appear at the 0-1 output of switch 266 during half of each machine cycle. Assuming now that flip-flop 258 is producing a signal from port 0-2, the AND gate 262 will be switched so as to have the output thereof directed through the 0-1 output line and thence to a right hand or C-2 control port of the flip-flop 294. This will bias the flip-flop 294 output to the 0-2 side, and pressure in the 0-2 output line, suitably amplified if necessary, will urge the piston in the rejector assembly 296 to the retracted position, thereby permitting passage of a good cap past the rejector station.

Referring now to the second back pressure switch 268, it will be noted that because of the position of the piston and cylinder assembly 274, back pressure is normally maintained in this switch, keeping the output thereof biased to the 0-1 position and causing the output thereof to be fed to the C-3 control port of the INHIBITED OR gate 302. Accordingly, with the cam 276 furnishing 40° of opening only, a signal will appear at the gate 302 from 0° to 170° of machine operation and from 210° to 360°. These signals will cause bleeding of the output of the gate 302 through the 0-1 port during this time. It may also be noted that the other input to the control port of the gate 302 comes from the 0-2 output of the OR/NOR gate 254 in the signal processing section 252. A signal is available in this line between 0° and 80° and from 170° to 360° of machine operation, with the OR/NOR gate 254 being normally switched to its 0-1 output state from 80°, when the signal from switch 236 first appears to 170°. Thus, if conditions are satisfactory, the gate 302 is always maintained in the vented or )—1 output condition. In other words, when the cap 28 is in the chuck or resting in the anvil 40 with the tip 112 engaging the cap 28, the detector spool 110 sufficiently closes control port 122 to furnish at least one signal to the gate 254.

Referring now again to the back pressure switch 268 during its other or vented mode, namely, during 170° to 210° of machine rotation only, back pressure thereon is released by the action of cam 276, and the output appears at the 0-2 port, being fed to the lefthand or C-1 control of the flip-flop 260. The flip-flop 260, having previously received a signal from the C-2 port by reason of the action of the multivibrator being actuated at about 80° of rotation, and switching the flip-flop 260 to the 0-2 position, the pulse of pressure in the C-1 control port switches the flip-flop 260 back to an 0-1 output, thereby bleeding the air and providing no signal during this time to the AND gate 280. It will also be seen that the presence of a good cap, which was reflected in the output signal of the AND gate 262, also feeds the lefthand or C-1 input of a flip-flop 286. The presence of a good cap signal here switches the flip-flop 286 to the 0-1 output condition, and a signal in the line between this 0-1 port and the counting circuit 290 serves to cancel any previous count of 10 or fewer bad caps and to reset the counting circuit 290 to zero.

Although not heretofore explained in detail, and although not necessary to the invention per se, it will be understood that the counting circuit 290 actually comprises a fluidic binary counting circuit of a well known type. Assuming that the preset number to be counted is 10, this circuit is adapted to be reset at any time a good cap is present when less than ten consecutive bad caps have been encountered. Accordingly, every good cap results in biasing the flip-flop 286 to the righthand or 0-1 output, furnishing a signal to the counting circuit 290 which will reset the same. The flip-flop 286 also has another input, which is fed by one of the outputs of the back pressure switch 312. This serves to provide proper start-up conditions for the flip-flop 286, making sure it is biased to the 0-1 output condition. Referring again to the back pressure switch 312, it will be noted that one of the multiple outlets thereof is adapted to communicate during start up with the righthand or C-2 input of the flip-flop 304, biasing this flip-flop to the 0-2 output, which causes a green condition to be shown by the indicator 226. This is the normal condition of gate 304, since only a bad cap will cause the flip-flop 304 to send a signal to the flip-flop 306. Assuming that no signal appears to bias the flip-flop 304 in the other or 0-1 direction, it will be noted that the INHIBITED OR gate 306 will not receive a biasing signal from the flip-flop 304 at the C-1 port. Moreover, module 306 will not receive a signal through port C-3 from the counting circuit 290 unless ten consecutive bad caps have been detected. Accordingly, fluid flow will continue through the 0-2 or normal output port of the gate 306, maintaining a positive pressure in the line connected to the switch contacts 318 which are urged open but which remain closed under fluid pressure to maintain electrical continuity in series with the main, manually operated switch 316 to keep the machine in operation.

Accordingly, only loss of pressure in the entire fluidic system or ten consecutive bad caps will create a signal which the INHIBITED OR gate 306 may translate into a machine stoppage signal. If desired, a pneumatic or other amplifier (not shown) may be interposed between module 306 and the switch 318.

Referring now to the operation of the apparatus in the event that caps 28 are present in the pockets 36 of the wheel 34, but that one or more of such caps 28 are determined by the tester to have one or more of the flaws set forth above, the result will be the presence of back pressure in switch 232, but either premature loss of this back pressure, or failure to develop back pressure in the switch 238 or in the Schmitt trigger 244.

Whereas the OR gate 254 will be switched by even momentary signals from OR gate 234, so as to actuate the multivibrator 256 and switch flip-flops 258, 260 to the 0-1 and 0-2 outputs thereof respectively, the OR gate 250 will remain in the 0-1 state by reason of any input of the C-1 or C-3 ports, or by reason of a C-5 input pressure appearing before the Schmitt trigger detects back pressure in the chamber 150. Consequently, no signal will appear at the C-4 port of the flip-flop 258. Therefore, the C-1 port of the "bad" AND gate 264 receives the signal instead of the counterpart port of the good AND gate 260, and when back pressure from the switch 266 appears at the C-3 port of gate 264 just after 180° of machine operation, a signal will be fed from the 0-1 port of gate 264 to the C-2 port of the flip-flop 286. This signal creates the conjunctive conditions necessary to initiate consecutive counting in the counting circuit 290, since it removes the signal from the 0-2 port of the gate 288 and furnishes a positive signal to the counting circuit 290 by way of the C-3 port of the AND gate 280 whose 0-1 output communicates with the counting circuit 290 as described above. At the same time the gate 280 furnishes a positive signal to the counting circuit 290, the OR gate 284 returns to its 0-2 output state. This furnishes the signal through an amplifier 282 to the cumulative bad cap counter 216. As pointed out above, this counter is of a type requiring both a positive input signal and the subsequent disappearance of this signal to complete a unit count and hence counts independently of the duration of the pulse furnished to it.

Since the bad AND gate 264 rather than the good AND gate 262 is switched to the 0-1 state, the good gate 262 will not produce an 0-1 signal, and no signal will be fed to the C-2 port of the flip-flop 294. Instead, the 0-1 signal from the AND gate 264 will appear at the C-1 port of the flip-flop 294, and output at the 0-1 port thereof, suitably strengthened by an amplifier schematically shown at 298, will actuate the piston and cylinder assembly 296 of the rejector 32 (FIG. 1), deflecting a cap 28 on to the rejected cap chute 30.

Referring now in more detail to other types of test failures and to the operation of the OR/NOR gate 250, it will be noted that this gate is ordinarily biased to the 0-1 position because pressure appears during the cycle of machine operation in one or more of the control ports C-1, C-3, or C-5 not only when no tests have yet been performed, and not only after a test has been performed, but also in the event that a test is being performed but not passed. Thus, with no cap present, back pressure will not be developed for sensing by switch 232, causing a continuous C-5 signal at the gate 250.

If the spool is positioned so as to detect insufficient compound, a signal will also appear at C-5 even though such signal may have been transiently removed from gate C-5 during the time cap presence only was detected (80° to 88° of machine operation). If too much compound is present, a signal will be present in control port C-3, whereas if back pressure cannot be maintained or sustained in chamber 150, the output from the Schmitt trigger 244 will appear as a control signal at port C-1 of gate 250. Although these tests are initiated at different times, all are arranged so as to have at least a predetermined overlapping time when all determinations are being made, namely, from 103° to about 125° of machine operation. Therefore, it is only during this period that all three signals will possibly be conjunctively absent from the inputs C-1, C-3, C-5. Thus considered, the three-input OR/NOR gate 250 actually requires at least a passing conjunctive indication that the tests being performed have been passed, since the failure of any one of these tests in the alternative would bias the OR/NOR gate 250 to a position such that the flip-flop 258 could not be biased so as to feed a control signal to the Good Cap AND gate 262.

The section 230 of the circuit 200 is entitled "Cap Presence-No Compound-Insufficient Compound," because the pressure is closed by the spool to generate back pressure if these tests are passed; the section 236 of the circuit 200 is entitled "Too Much Compound" because of the switch 238 is activated by closure of port 124, and it is because section 242 of the circuit 200 includes the OR/NOR gate 250 which receives a summary of the passage of all tests that this section 242 is called the "Final Decision" section as well as the section which detects faults in the shell of the cap.

In contrast to the gate 250 which must conjunctively be freed from signals at three control ports, it will be noted that the multivibrator 256 is operated in the alternative by signals from either the switch 232 or the switch 238, it being understood, however that the duration of the output pulse thereof will in the one case be sufficient at least to properly bias the flip-flops 258, 260 and will in the other case, namely, detection lasting more than the predetermined output duration of the multivibrator signal, nevertheless be limited to its predetermined maximum time constant.

Referring now to another of the functions performed by the apparatus of the invention, namely, the detection of a retained cap, it will be noted that the INHIBITED OR gate 306 includes a C-3 input which is actuated only in the event ten consecutive bad caps are encountered, and also includes a C-1 input fed from the 0-1 output of flip-flop 304, which in turn will develop an 0-1 output only in the presence of a C-1 signal from the 0-2 port of the OR gate module 302. The C-3 port of the gate 302 is in a sense pressurized positively mechanically, since from 0° to 170° and from 210° to 360° of machine operation or cam angle, the cam 276 permits the pressure port of the module 268 to remain blocked. Also, the C-1 port of module 302 receives a signal from OR gate 254 from 0° to 80° and from 170° to 360° of cam angle or machine operation. Thus, a control signal is normally always present to deactivate module 302. However, if a cap 28 undesirably remains stuck within or otherwise associated with the curling mechanism as the anvil 40 is lowered, the spool 110 cannot drop fully to the lowered position thereof shown in FIG. 2. Accordingly, back pressure will continue to be developed in one or both switches 232, 238 and therefore one or both OR gates 234, 240 will supply control pressure to the OR gate 254 past 170°. This will cause lack of pressure in the line connecting the 0-2 port of the gate 254 and the C-1 port of the OR gate 302, and for this time, namely, between 170° and 210° of cam angle or machine operation, the output of the gate 302 will be through port 0-2, switching flip-flop 304 to 0-1, venting OR gate 306 and permitting switch contacts 318 to open and stop the machine prior to the time the cycle is repeated. This prevents jamming of two or more caps against the detector head and avoids potential damage thereto.

Bearing in mind that the operation of the OR/NOR gate 250 and the operation of the multivibrator 256 are normally carried out in the early portion of the cycle of the machine, and that these elements serve to precondition or bias one or more flip-flops into predetermined positions for eventual receipt of additional processing signals, reference will now be made to the pressure switches 266, 268, to the cams 272, 276 respectively, associated therewith and to the functions performed thereby. Principally, the cams 272, 276 periodically furnish and release back pressure in the switches 266, 268 to perform the function of delaying a signal which is transiently stored or "memorized" in the system by the flip-flops, which inherently will maintain a given position for an indefinite time. In other words, once a flip-flop is biased to a particular output, it will remain in this state, while the output thereof can be converted at any time from merely a potential signal to an actual signal by feeding the output to one of the two control inputs of an AND gate, the other of which is served by a timed fluidic pulse. Accordingly, for example, the C-1 port of an AND gate may be in continuous receipt of a signal emanating from a flip-flop, but the 0-1 output will not be developed in the AND gate until another or C-3 signal is present. Accordingly, the cam 272 does not create back pressure at switch 266 until 180° of machine operation, and until this time, signals cannot be released from either of the AND gates 262 or 264, thus providing for a desired certain amount of time delay in operating the rejector 32. Similarly, fluidic back pressure is periodically released in one line by cam 276 and made to appear in another line during this time, in order to check for the presence of other fluidic signals and to bias other flip-flops.

While the gate 250 and the multivibrator 256 are operated fluidically in response to conditions determined by fluid flow in the testing head 24, the operation of the pressure switches 266, 268 is controlled solely in response to the rotational position of the machine at any time. For this reason, the numbering of the degrees of cam rotation corresponds to the degree numbering used in describing operation of the entire machine, including the numbering set forth in FIGS. 6 and 7.

Although not necessary to the practice of the invention, it is preferred that the cams 272, 276 form an integral part of the flywheel or like parts (not shown) of the drive mechanism which operates through a conventional connecting rod or yoke arrangement to reciprocate the anvil 40, and to index the plate 34. Although positively mechanically actuated by the cams 272, 276, the piston and cylinder assemblies 270, 274 will be understood to be associated only with the fluidic or logic portions of the apparatus and are not provided for the purpose of operating any other physically moving parts thereof.

Referring now to the possibility that ten consecutive bad caps have been encountered, it will be apparent that the counting circuits 290 will not have been reset by a signal at the 0-1 output of flip-flop 286, and assuming that the other conditions, namely negative input from the OR gate 288 and a positive input from the AND gate 280 have consecutively aggregated ten or any other preset number, a signal will appear at the red indicator 28 and an output signal will also be fed to the INHIBITED OR gate 306, thereby causing the output to switch to the 0-1 port and causing loss of pressure in the line between the 0-2 port and the normally open switch 318. This will release the switch and stop operation of the machine. After the cause of the sequence of bad caps has been corrected, the machine may be again started or reset by manually pushing the button 310, thereby causing back pressure in the pressure sensitive switch 312. Plural outputs thereof serve simultaneously to set the flip-flop 258 to the desired or 0-2 position, to reset the sequence counting circuit to zero, by applying pressure at C-3 to flip-flop 286, and to set the preferenced flip-flop 304 to the desired condition to show green at the signal 226 and to bias the flip-flop to the desired condition for start-up.

Referring now to certain aspects of the illustrated embodiment of the invention, assuming that a cap curler and tester according to the invention is operated at a speed of 240 cycles per minute, which is within the capability of a modern cap curling apparatus, the entire 360° machine operation will take 0.250 seconds. Assuming the cap 28 to be engaged by the anvil 40 at the 36° mark and assuming that the test is completed at the 125° mark shown in FIG. 7, the cap will rest on the anvil for just over 60 milliseconds. The time for determining the presence of the cap, namely machine operation from 80° to 125°, is about 31 milliseconds, while the compound thickness determination taking place from 88° to 125° occupies 25 milliseconds, and leak testing requires only 15 milliseconds. After these times, release of the cap is initated and back pressure in at least chamber 150 begins to be lost. Assuming that the switching times of the fluidic modules in question are operative between 200 cycles per second or 5 milliseconds for counters, AND/NAND gates, OR/NOR gates and INHIBITED OR gates, flip-flops, and back pressure switches, 100 cycles per second or 10 milliseconds for the Schmitt trigger, and up to 40 cycles per second or 25 milliseconds for the multivibrator, the tester of the invention has an immediate speed potential of 360 cycles per minute, that is, at least 50 percent greater than the 240 cycles per minute just described.

The foregoing paragraph is based on the assumption that the mechanical movement characteristics of the anvil remain unchanged, that is, the gradual lift thereof as illustrated in FIGS. 6 and 7 is retained, and that no attempt is made to increase the lift rate thereof or prolong the duration of contact between the cap and the curling and testing head in terms of degrees of machine operation. As pointed out elsewhere herein, it is an advantage of the invention that the testing head and logic circuit can be used in combination with curling machines already in existence without changes being made thereto. In these machines, no independent effort has been made to increase the vertical acceleration of the anvil or to extend the duration of maximum or near-maximum anvil height. However, it is clear from an examination of FIG. 7 that very little change in the lift profile of the anvil mechanism would have to be made to lengthen these times considerably. To the extent these times were lengthened to prolong test times, operating speeds could be increased. In other words, if the time permitted to perform the test taking the least time were doubled, the cyclic operation rate of the machine could be doubled.

Moreover, the described machine shows that the shortest duration test, namely, the test for a proper shell and for radial flaws in the compound is carried out by a Schmitt trigger having a response time of 10 milliseconds. It is believed that a back pressure switch of the type already available and having a switching time of 5 milliseconds could be substituted for the Schmitt trigger, permitting a further doubling and speed potential. The response times of certain other elements in the fluid circuit are generally not critical, since even at machine speeds of 1,000 cycles per minute, the fluidic circuit as a whole would have as much as about 66 milliseconds for processing, counting, and rejection, even though all testing might typically be carried out during 5 to 10 milliseconds based on the modified forms of apparatus just discussed. Speeds of this order are therefore readily attainable without alteration of existing physical handling equipment, using the fluidic testing and signal processing technology described herein.

Referring now to certain additional details of the fluidic circuit 200, the counting circuit 290 has been shown in box form only. However, it will be understood that this counting circuit actually consists of several staged flip-flop and decision making components arranged to form a binary counter of a well known type. By way of example, four counters may be used in a circuit having a capacity of up to 16 numbers. In other words, since each binary counter is able to operate only one digit, a single counter can indicate only the number zero or one, numbers up to four may be indicated with two counters, numbers up to eight with three counters, numbers up to 16 with four pairs, etc., it being understood that binary counting occurs in powers of two. Accordingly, the counting circuit 290 merely consists of these binary counting modules arranged in a manner known to those skilled in the art to provide the function of counting and signal storage.

In the fluidic control art, it is also well known to provide the back pressure generating function by interruptible jet sensors rather than mechanically operated means for blocking a pressurizable port. The sensors may be disposed, for example, in a facing relation separated by a rotatable disc with a discontinuous periphery. This function of providing intermittent back pressure for periodically supplying certain signals to portions of the fluidic logic circuit may also be carried out by other known means.

In the final decision section 242 of the logic circuit 200, the Schmitt trigger 244 was shown for the purpose of detecting back pressure within the annular area just inside the cap skirt. However, in the event that the sensitivity of the Schmitt trigger is not required, and back pressure needs only to be sensed in a less critical manner, a back pressure switch alone would suffice for use in this area. Such an arrangement would be characterized by faster response times.

In the particular embodiment described, a single fluidic gate is used to test for the conjunctive absence or negative receipt of three individual signals, each associated with a measurable cap characteristic, with the fluidic gate being adapted to generate a single characteristic signal which is processed by the fluidic logic circuit. Such a construction is provided because at least portions of all the tests are performed simultaneously. However, it is apparent that means might be provided instead to perform the tests consecutively and to store consecutively received characteristic impulses or signals in a memory device for subsequent individual or simultaneous removal in response to a fluidic trigger pulse. Accordingly, although an advantageous feature of the invention is that test results are integrated into a single signal before the signal is processed, this is not a necessary feature of the invention. Moreover, the illustrated form of apparatus rejects all articles unless indications are made that the tests have been passed, but the apparatus might well equally be arranged to pass all articles unless a test failure were indicated.

In the embodiment shown, the presence of the cap and the thickness of the gasket were shown to be detected or measured individually, and one pressurizable port was provided in the tester for each of these functions, with a pressure sensitive switch operatively associated with each port. This construction has the advantage of individually displaying to an observer which of several characteristics of the article being tested are unsatisfactory as the tests are made. However, it is apparent that a single back pressure detector might be associated with plural parallel pressurizable ports, for example, or that some but less than all testing and detecting functions might be combined.

Referring now to the functional rather than the constructional details of the preferred form of circuit 200 herein described in detail, it will be seen that the device has means for detecting the presence of an unprocessed cap so that the testing sequence may be initiated, means for determining whether too much compound is present, whether too little compound is present, whether the shell is proper and whether the cap has a gasket of uniform and continuous cross-section, means for indicating whether or not all tests have been satisfactorily performed, and means for releasing a fluidic signal to a given storage area if the tests were not satisfactorily performed, with the signal indicating a satisfactory article being further processed to prevent actuation of means for removing the faulty cap from a manufacturing line.

Moreover, the device preferably includes means for performing auxiliary functions such as counting the number of bad caps made and for stopping machine operation under predetermined conditions. The testing head used with the fludiic apparatus includes means for performing a finishing operation on the cap and means for forming one or more fluid tight chambers between a portion of the cap and the head when the cap is satisfactory, and a multiaction positionable sensor for creating detectable back pressure in a predetermined sequence under predetermined conditions.

The foregoing description has not made specific mention of many of the mechanical variations which might be made in the apparatus of the invention. However, one mechanical variation which is sometimes preferred is the substitution of a single acting, spring biased piston and cylinder assembly for rejecting the faulty caps in place of the double-acting piston and cylinder assembly 296. Thus, it is sometimes preferred to sping bias the piston to the inactive position of the rejector such that the spring urges the rejector to a withdrawn position permitting cap passage of caps along the advancing means. In this arrangement a fluidic pulse or signal in the 0-1 port of the flip-flop 294 continues to actuate the fluidic amplifier 298 to operate in turn the piston and cylinder 296, while the 0-2 port of the flip-flop 294 is merely vented, amd receipt of a signal indicating the presence of a satisfactory manufactured article is not required to perform the function of maintaining the rejector in the inactivated position.

Other mechanical variations include the physical separation of certain portions of the testing head assembly or the like in the event that tests are desired to be carried out consecutively in the manufacturing line. In such a case, the fluidic portions of the circuit might be integrated in the same manner as described in detail above, or means might be provided to process the signal individually within the logic circuit if desired.

Referring now to certain other variations and uses of the invention which are specifically contemplated as being useful, the tester head unit may be manufactured in such a way as to provide means for defining, in combination with the article to be tested, a plurality of fluid-tight chambers rather than the single fluid-tight chamber described in detail above. In other words, the profile of the finished article, including the gasket formed therein, can be determined by shaping the end portion of the tester head to a desired contour so that fluid-tight chambers are defined between several spaced apart portions of the head and the cap or can end only where the desired contours, dimensions and tolerances are met. If the caps or can ends are deficient in one or more particulars of dimension or contour, leakage will occur from or between one or more of the chambers, and such leakage may be detected in the manner pointed out above.

A tester head of the type just described may be arranged so as to provide any reasonable number of air tight chambers, and may also be arranged so as to include one or more remotely situated valves adapted for actuation by a valve control other than a valve stem or its equivalent. Such an arrangement may use the same fluidic system as that described above, but need not depend for operation upon direct contact between a part of the valve and the article. Control systems of this type include systems which perform tests by optical or other non-fluidic means, but which may be interfaced with fluidic controls in a known manner.

The foregoing detailed description of certain preferred forms of the apparatus of the invention was made in reference to embodiments where bottle or jar caps were the articles to be tested. As is well known in the art, jar caps are generally formed by punching circular blanks from large sheets of steel or other suitable material on so-called double die presses, and thereafter imparting a flange or skirt to the circular blank to form the same into the shape of a cap. As is well known, ends for cans are normally formed in the same way, and such can ends resemble jar caps in most important respects, the principal differences between can ends and jar caps being the type of compound used as the gasket material, and the configuration of the skirt.

The contour of the end portion may be the same, or may be somewhat different, with certain forms of caps and can ends including various flat panels offset from each other. In the case of can ends, the portion thereof corresponding to the skirt extends generally radially in the completed cap and is only formed into an axial flange portion of a double seam after the end is placed over a flanged cylindrical or other container body and the two are "double seamed" together.

Essentially, however, conditions causing failure of a jar cap are generally the same as those which cause failure in a can end, namely, discontinuities in the compound, the presence of too much or too little compound, lack of roundness or other desired profile in the end when viewed in plan, cracks or clipped out portions in the outer edges or margins, as well as miscellaneous defects such as wrinkles, pin holes and the like. All of the foregoing defects are ordinarily manifested by failure of the end to fit within a desired profile, and accordingly, such flaws or defects may be detected by the presence of fluidic signals when a chamber which is supposed to be air tight fails to hold pressure therein, or where various portions of the cap are not sufficiently within tolerance to form a fluid-tight chamber or to position properly a movable detector such as the stem of a valve spool controlling fluidic flow.

In addition to the foregoing relatively general statements, it may be appreciated that problems of can end leakage or potential leakage have been greatly increased with the advent of easy opening can ends. Such ends are made at extremely high speeds under very carefully controlled tolerances; however, occasional failures still occur because of improper scoring or riveting in the case of ends having scored tear-out portions with integrally formed rivet tabs, and improper crimping and sealing in the case of ends which include separate tear-out panels inserted in an opening and crimped in place therein. Testers of the general type described herein therefore have a very high potential for use in fields such as this, and accordingly may be used to test can ends when equipped with suitable testing heads.

The form of invention described in detail is one wherein curling and testing occur simultaneously. In cap ends using gasket or sealing compound material, dimensional checks thereon can best be made only after the compound has cured, and accordingly, it may be that the cap will have been curled or otherwise formed prior to testing so that no operation need be performed thereon when testing occurs. Whether or not a forming or other operation is concurrently performed, however, the testing apparatus and method of the invention still provide a substantial number of important advantages.

It will thus be seen that the present invention provides an improved apparatus for processing and testing manufactured articles, such apparatus having a number of advantages and characteristics including those referred to specifically herein and others which are inherent in the invention. A preferred embodiment of the invention having been described by way of example, it is apparent that a number of modifications and variations to this form of apparatus will be apparent to those skilled in the art and it is contemplated that such changes or variations may be made without departing from the spirit of the invention or the scope of the appended claims.

We claim:

1. An apparatus for testing manufactured articles, comprising in combination, a tester unit having a head assembly with at least one fluid passage therein, blocking means operable at a given time for at least partially blocking fluid flow in said at least one passage in response to a detectable condition of at least a portion of a manufactured article to be tested, a fluidic signal processing circuit forming a part of said apparatus, means for supplying a first characteristic fluidic signal to said signal processing circuit upon detection of back pressure in said at least one passage and for supplying a second characteristic fluidic signal to said fluidic circuit in the absence of back pressure in said at least one passage, means for activating a separating mechanism for separating satisfactory tested articles from faulty tested articles, and an operative connection between said signal processing circuit and said activating means for operating said activating means in accordance with the receipt of one of said first and second signals and at a predetermined time subsequent to said given time.

2. An apparatus as defined in claim 1 wherein said tester unit includes a portion for receiving a portion of the manufactured article for performing a finishing operation thereon when said article and said head assembly are in operative association with each other.

3. An apparatus as defined in claim 1 wherein said means for at least partially blocking fluid flow includes a relatively movable element having a portion for engaging a part of the manufactured article, said element being positioned in use by the position of said manufactured article.

4. An apparatus as defined in claim 1 wherein said head assembly includes at least two spaced apart means each for contacting a portion of said manufactured article and forming, in combination with said article, at least one fluid tight chamber to create said detectable back pressure in said passage when said fluid is supplied thereto under pressure.

5. An apparatus as defined in claim 1 wherein said means operable at said given time for blocking fluid flow includes at least one element having a portion thereof for engaging one portion of said manufactured article, and wherein said head assembly has a portion for engaging another portion of said manufactured article, said at least one element being movable relative to the portion of said head assembly with which said element is associated in use, whereby differences in the locations of the portions of said article contacted by said head means and said element are indicated by the relative position of said movable element.

6. An apparatus as defined in claim 1 wherein said at least one fluid passage comprises at least two fluid passages, and wherein said blocking means includes a separate element for blocking each of said passages.

7. An apparatus as defined in claim 1 wherein said blocking means includes relatively movable means normally urged into a position thereof wherein said at least one passage is not blocked, and wherein positioning of a satisfactory manufactured article in registry with said head assembly acts to urge said movable means into a position thereof which blocks said at least one passage.

8. An apparatus as defined in claim 1 together with means for supplying a third signal indicative that an article has been positioned for testing and said fluidic signal processing circuit includes means for receiving said third signal, and means responsive to said third signal for establishing predetermined conditions in at least portions of the remainder of said circuit independent of the results of any previous signal processing performed by said circuit.

9. An apparatus as defined in claim 1 wherein said fluidic circuit includes single means for storing a signal indicative of the condition of the article being tested, said single means having first and second outputs, and first and second means associated respectively with said outputs for actuation thereby, said first and second means each requiring for operation thereof conjunctive receipt of a signal from said single means and a signal generated periodically by said apparatus independently of the condition of said article being tested, whereby a signal indicative of the condition of said article may be stored so as to await further processing until it is desired to be released by said periodically generated signal.

10. An apparatus as defined in claim 1 wherein said at least one passage comprises a plurality of passages, wherein a separate means for supplying said first characteristic signal is provided for each of said passages, and wherein means is provided in association with said circuit for creating a signal indicative of a satisfactory article only upon conjunctive receipt by said signal creating means of a first characteristic signal from each of said separate means.

11. An apparatus as defined in claim 1 wherein said apparatus is particularly constructed for use with a closure having a skirt portion and said tester unit includes a curl-forming groove in said head assembly for engaging the skirt portion of a closure, and wherein said apparatus includes means for positioning a closure adjacent said head assembly and for forcing said closure axially of said assembly for imparting a curl to said closure.

12. An apparatus as defined in claim 1 wherein said fluidic circuit includes processing means for cumulatively counting the number of said second characteristic fluidic signals received by said processing circuit, whereby a count of the faulty manufactured articles may be made.

13. An apparatus as defined in claim 1 wherein means is provided in said processing circuit to activate said separating mechanism once for receipt of each of said second characteristic signals, wherein means are provided for counting the number of consecutive occurrences of said second characteristic signal, wherein means are provided for resetting said counting means when said processing circuit receives one of said first characteristic signals, and means associated with said counting means for stopping operation of said apparatus upon receipt by said counting means of a predetermined consecutive number of said second characteristic signals.

14. An apparatus as defined in claim 1 wherein means is provided for furnishing a signal to said processing circuit to indicate the association of said apparatus and an article to be tested, and wherein determining means is provided in said apparatus for determining whether a article remains associated with said apparatus in a predetermined portion of the operating cycle of said apparatus, and wherein means are provided for operative association with said determining means to stop operation of said apparatus on receipt of a signal indicating that an article remains associated with said apparatus.

15. An apparatus as defined in claim 1 wherein said means for supplying said first characteristc fluidic signal is in the form of a fluidic back pressure switch.

16. An apparatus as defined in claim 1 wherein said means for supplying said first characteristic signal to said processing circuit is in the form of a fluidic Schmitt trigger.

17. An apparatus as in claim 1 wherein said processing circuit includes detector means for indicating the presence in said apparatus of an article to be tested, wherein said processing circuit includes a one-shot multivibrator, and an operative connection between said detector means and said multivibrator, and at least one bistable fluidic device in said processing circuit operatively associated with said multivibrator, whereby an output signal from said multivibrator will predetermine the condition of at least a portion of said processing circuit and whereby the condition of said processing circuit for processing a given one of said signals is independent of the condition of said circuit during the time a similar preceding signal was processed by said processing circuit.

18. An apparatus as defined in claim 1 in which said processing circuit includes means for receiving condition indicating signals indicative of a condition of articles, means for storing said condition indicating signals for a predetermined time, means for releasing said condition indicating signals for subsequent processing, means positively responsive to said first characteristic signal and to said second characteristic signal to control activation of said separating mechanism, and means forming a part of said fluidic circuit for performing at least one auxiliary function.

19. An apparatus as defined in claim 1 in which said processing circuit includes means forming a part thereof for activating a mechanism adapted to stop operation of said apparatus in response to a signal indicating at least one predetermined condition exists in said circuit.

20. An apparatus as defined in claim 1 wherein said means for supplying said first and second characteristic fluidic signals comprises a plurality of separate means, at least one of said separate means including a first switch responsive to back pressure, said switch having a predetermined sensitivity and being associated with a passage adapted to be blocked for a predetermined time in the use of the apparatus when a satisfactory article is being tested, and wherein at least another of said separate means comprises a back pressure responsive fluidic switch of greater sensitivity than that of said first switch, said apparatus being adapted to provide detectable back pressure in the passage with which said more sensitive switch is associated for a shorter length of time than said predetermined time.

21. An apparatus as defined in claim 1 which further includes means for consecutively moving a succession of manufactured articles to a position adjacent said head assembly, for moving said articles into a position of registry with said head assembly, and for removing said articles from said head assembly for continued movement toward an area for sorting satisfactory and faulty one of the articles.

22. An apparatus as defined in claim 1 wherein said at least one passage comprises a plurality of passages, and wherein said head assembly includes a relatively fixed and a relatively movable portion, and wherein said relatively movable portion includes said blocking means disposed therein, said blocking means being also mounted for independent movement in respect to said movable portion of said head assembly, whereby said blocking means may be positioned in relation to said movable means by contact with an article so that detectable back pressure may be produced in one of said passages at a given time and so that contact between an article and said other movable part may subsequently cause movement of said movable portion without causing movement of said blocking means.

23. An apparatus as defined in claim 22 in which means are provided in said relatively fixed portion for receiving a portion of the manufactured article and forming the manufactured article portion upon relative movement between the manufactured article and said fixed portion while the manufactured article is in contact with said movable portion.

24. An apparatus as defined in claim 22 in which one of said passages communicates between a portion of said head assembly and a chamber defined at least in part by portions of a manufactured article, said fixed portion, and said movable portion, whereby detectable back pressure may be produced in said chamber in the presence of a satisfactory manufactured article.

25. A combination cap curler and tester comprising, in combination, a curling die having portions adapted to engage the skirt portions of an individual cap, means for periodically moving caps into a position of registry with said curling die and for removing caps therefrom, a tester head having a plurality of fluid passages therein, a movable detector spool associated with said head and having plural lands thereon, said spool being movable such that said lands cover and uncover at least portions of at least some of said passages upon movement of said spool, means forming a part of the curler and tester for engaging two spaced apart surfaces of a cap to define therebetween a fluidtight chamber, at least one of said passages communicating with said chamber, pressure sensitive fluidic signal generating means associated with each of said passages, means for supplying fluid continuously through said passages, portions of said detector spool being adapted to be engaged by portions of a cap during testing whereby said spool is moved to a position indicative of the characteristics of a cap being tested, said signal generating means being operative to generate a cap position indicating signal indicating that a cap is positioned for testing, a fluidic circuit including means for receiving a cap position indicating signal, means for establishing predetermined conditions in said circuit in response to receiving said cap position indicating signal, said signal generating means also being operative to produce a first fluidic signal when back pressure is simultaneously present in all of said passages, storage means for storing said first fluidic signal within said circuit for a predetermined time, releasing signal means for periodically releasing said first fluidic signal from said storage means, and rejecting means adapted to reject a cap being tested if said first fluidic signal is not received by said rejecting means shortly after receipt by said storage means of said releasing signal means.

26. A combination curler and tester as defined in claim 25 in which said spool and said passages are arranged so that less spool movement is required to close one of said passages than is required to close another passage, and such that a predetermined amount of total spool movement will close all passages closable by said spool, whereby said position indicating signal indicating that said article is positioned for testing may be generated prior to generation of back pressure in all of said passages conjunctively, and whereby said fluidic circuit may be conditioned in advance of reception of said first fluidic signal indicating that the cap then being tested is satisfactory.

27. A combination curler and tester as defined in claim 25 wherein three of said passages are provided, wherein said spool is able to block the first and second of said passages and the third passage is adapted to generate back pressure when said means for positioning and removing a caps registers said cap with said curling die, and wherein said tester head is arranged so that back pressure is successively generated respectively in said first passage, said second passage and said third passage.

28. A combination curler and tester as defined in claim 25 wherein three of said passages are provided, wherein said spool is able to block the first and second of said passages and the third passage is adapted to generate back pressure when said means for positioning and removing caps registers a cap with said curling die, and wherein said tester head is arranged so that back pressure is successively generated respectively in said first passage, said second passage and said third passage, and wherein said pressure sensitive fluidic signal generating means associated with said third passage for generating said cap position indicating signal is more sensitive than said pressure sensitive fluidic signal generating means associated with said first and second passages.

29. A tester head for use in testing manufactured articles, said head having a relatively fixed portion and a relatively movable portion, a plurality of fluid passages in said head, and blocking means disposed in said relatively movable portion for blocking at least one of said fluid passages, said blocking means being also mounted for independent movement in respect to said movable portion of said head, whereby said blocking means may be positioned in relation to said movable portion by contact with an article so that detectable back pressure may be produced in one of said passages at a given time and so that contact between an article and said movable portion may subsequently cause movement of said movable portion without causing movement of said blocking means relative to said movable portion.

30. A tester head as defined in claim 29 in which means are provided in said relatively fixed portion for receiving a portion of a manufactured article and forming the portion of said manufactured article upon relative movement between the manufactured article and said fixed portion while the manufactured article is in contact with said movable portion.

31. A tester head as defined in claim 29 in which one of said passages communicates between a portion of said head and a chamber defined at least in part by portions of the manufactured article, said fixed portion, and said movable portion, whereby detectable back pressure may be produced in said chamber in the presence of a satisfactory manufactured article.

32. A tester head as defined in claim 29 wherein means are provided for biasing said blocking means and said movable portion of said tester head into a predetermined initial position, and wherein said means biasing said blocking means are less strong than the means biasing said movable portion, whereby, upon engagement between an article to be tested and said tester head, said blocking means will be positioned before said movable portion of said head is moved.

33. A detector head assembly for performing plural, at least partially simultaneous, tests on manufactured articles, said assembly including a plurality of fluid passages, controlling means for controlling fluid flow in said passages in a predetermined sequence, said controlling means being positionable by contact with a portion of a manufactured article being tested so as to cover at least one of said passages without covering the others, and said controlling means being further positionable to cover all of said passages, means for causing fluid flow in said passages and means for detecting blockage of said passages by sensing the back pressure developed in said passages, whereby contact of said controlling means with a single article creates plural signals indicative of the condition of said article.

34. A detector head assembly as defined in claim 33 wherein said controlling means, upon still further movement, is adapted to uncover at least one previously covered passage, whereby movement of said controlling means in a single direction will successively block at least one passage, then all passages, and then unblock at least one previously blocked passage.

35. A detector head assembly as defined in claim 33 wherein said head assembly includes a sleeve unit and said controlling means being a spool movable axially therein, said sleeve having ports therein forming parts of each of said passages, said ports being axially spaced apart on the inner surface of said sleeve, and said spool having lands thereon arranged such that the lands are of greater axial extent than the ports, said lands being spaced apart such that the leading edge of one land just covers one port while the trailing edge of another land just covers another of said ports, and whereby spool movement will first cover one of said ports, then all of said ports and then uncover another of said ports.

36. A detector head assembly as defined in claim 33 wherein means is provided for normally urging said positionable controlling means into a position wherein said passages are normally uncovered, and wherein forces applied to position said article may overcome the force of said urging means.

37. A detector head assembly for performing plural, at least partially simultaneous tests on manufactured articles, said assembly including a plurality of fluid passages, means for controlling fluid flow in said passages, said controlling means including means positionable by contact with at least one portion of the manufactured article so as to cover at least one of said passages, said controlling means also including means for contacting portions of said article so as to form, in combination therewith, a fluid tight chamber, means for causing fluid flow in said passages and means for detecting blockage of said passages by sensing the back pressure developed in said passages, whereby contact with a single article creates plural signals indicative of the condition of said article.

38. A detector head assembly as defined in claim 37 wherein said means for contacting portions of said article for forming said chamber includes means for changing the shape of at least the portions of said article contacted thereby.

39. A detector head assembly as defined in claim 37 wherein said positionable means is positionable independently of said means for contacting said article to form said chamber, whereby said positionable means may be positioned to create one of said plural signals, and whereby relative movement may occur during creation of another of said plural signals between portions of said means for contacting said article to form said chamber without the occurrence of relative movement between said positionable means and the portion of said detector head with which said positionable means is associated in use, whereby creation of said other signal will not affect said one signal.

40. An article testing unit having means for performing plural, at least partially simultaneous, individual tests on a succession of articles to be tested, means for controlling separation of satisfactory articles from unsatisfactory articles, said unit being arranged such that a satisfactory individual test result is indicated by an individual fluidic signal generated by the presence of detectable back pressure in a test fluid, means for processing a sequence of single master fluidic signals to actuate said means for controlling separation of satisfactory articles from unsatisfactory articles, said unit also having means interposed between said tester and said processing means for creating said sequence of said master fluidic signals in response to receipt thereby of a plurality of said individual signals.

41. An article testing unit as defined in claim 40 wherein said interposed means is of the type to furnish first and second types of fluidic signals only, and wherein said first type of signal is created only by simultaneous receipt by said interposed means of individual signals indicating satisfactory completion of all individual tests, and wherein said second type of signal is created in response to any combination of signals indicating satisfactory completion of less than all of said individual tests.

42. A testing apparatus for manufactured articles to determine which articles are satisfactory and which are unsatisfactory, said apparatus comprising a tester having passage means for sorting satisfactory articles from unsatisfactory articles, means permitting passage of fluid therethrough, means for supplying fluid to said passage means, said apparatus having portions thereof adapted physically to contact an article being tested and position movable portions of said detector to cause detectably different pressure patterns in said fluid passage means in response to physically different characteristics of the articles; and entirely fluidic means for detecting said pressure patterns, for creating signals in response to different pressure patterns, for processing said signals including storing certain of said signals, and for periodically releasing said processed signals from storage to activate said means for sorting said satisfactory articles from said unsatisfactory articles.

43. An apparatus for testing a succession of individual manufactured articles including means for indicating the presence of an article to be tested and for performing a plurality of individual tests on each article, means for creating a first characteristic signal in response to the passing of all of said tests only by an article and for creating a second characteristic signal in response to the failure of an article to pass any individual test regardless of passing of any other of said plural tests, and a fluidic signal processing circuit including means for initially setting the condition of said circuit in response to a signal indicating the presence of an article for testing, means for discriminating between said first signals and said second signals, separate means for storing said first signals and said second signals when said signals are received by said fluidic circuit, mechanically operated means forming a portion of the apparatus for introducing a fluidic release signal periodically into said circuit, said separate storage means each requiring conjunctive receipt of said mechanically generated signal and one of said first and second signals to release a control signal, and sorting control means responsive to said control signals for controlling sorting of the tested articles, and sorting control means being arranged so that receipt of said second signal causes an article creating said second signal to be separated from other tested articles subsequent to performance of said tests.

44. A fluidic signal processing circuit for processing signals indicating the results of tests performed on manufactured articles, said processing circuit including a plurality of detector means for generating fluidic signals in response to detectable variations in fluidic back pressures caused by performing said tests including an article position test, processing means for processing said generated fluidic signals, means for predetermining the condition of said processing circuit in response to receipt of at least one signal from that one of said detector means indicating an article position, means actuable by conjunctive receipt of signals from all of said plurality of said detectors to create a first signal indicating satisfactory completion of all of said tests, and for producing a second signal to indicate a satisfactory completion of less than all of said tests, separate means for storing said first and second signals, means for periodically furnishing signals simultaneously to both of said storage means whereby the one of said storage means containing a signal will periodically release said signal, and means responsive to a released one of said first and second signals for actuating a sorting system to separate articles being tested.

45. A signal processing circuit as defined in claim 44 wherein at least one of said detector means for generating fluidic signals is in the form of a back pressure switch having a fluidic amplifier associated therewith.

46. A signal processing circuit as defined in claim 44 wherein at least one of said means for generating fluicic signals is in the form of a Schmitt trigger.

47. A signal processing circuit as defined in claim 44 wherein said means for predetermining the condition of said circuit comprises a one-shot multivibrator having the output thereof associated with at least one flip-flop gate, whereby said at least one flip-flop gate always assumes a predetermined output state upon receiving a signal from said multivibrator.

48. A signal processing circuit as defined in claim 44 in which said separate means for storing said first and second signals comprises a pair of AND gates, and wherein each AND gate has one control input thereof associated with one output of a single flip-flop, whereby an output signal will not be generated in either of said AND gates until a signal is fed thereto from said means for periodically furnishing a signal and from said flip-flop output.

49. A circuit as defined in claim 44 in which said means actuable by conjunctive receipt of signals from all of said detectors comprises an OR gate having plural control ports each having a control input and arranged so that each of the control inputs communicates with the output of a detector which produces a signal in the absence of detectable back pressure, and whereby said first signal is produced only in the absence of a control signal in any of said control ports.

50. A circuit as defined in claim 44 in which said means for periodically furnishing signals to said storage means comprises a back pressure sensitive switch with the fluid passage to which the control port thereof is connected being periodically opened and closed mechanically.

51. A circuit as defined in claim 44 wherein means is provided for counting only the number of second signals consecutively received by said apparatus.

52. A circuit as defined in claim 44 which includes means for counting the number of consecutive second signals received by said counting means and wherein said counting means is reset upon receipt of one of said first signals.

53. A method of testing manufactured articles comprising passing fluid through fluid passages in a test apparatus, physically engaging a portion of said test apparatus with portions of an article to be tested, thereby causing changes in the characteristics of the fluid flow within said passages in accordance with physical conditions of preselected separate and distinct portions of the article, creating different fluidic signals in response to different fluid flow characteristics, and feeding said signals to means for controlling separation of articles based on the ability of the physical characteristics of articles to create said changes in said fluid flow characteristics.

54. A method of testing manufactured articles as defined in claim 53 wherein there are valve means controlling said fluid flow and physically engaging said portion of said apparatus causes said changes in said characteristics of said fluid flow.

55. A method of testing manufactured articles as defined in claim 53 wherein physically engaging said portion of said apparatus serves to create a fluid-tight chamber between a portion of said apparatus and a portion of said article, whereby certain or said fluid flow may be controlled without physical movement of parts forming a portion of said tester.

56. A method of testing manufactured articles as defined in claim 53 wherein there are valve means controlling said fluid flow and physically engaging said portion of said apparatus causes said changes in said characteristics of a given portion of said fluid flow and wherein physically engaging said portion of said apparatus also serves to create a fluid-tight chamber between a portion of said apparatus and a portion of said article, whereby another portion of said fluid flow may be controlled without physical movement of parts forming a portion of said tester.

57. A method for testing a plurality of caps or like articles comprising successively positioning caps adjacent a testing head to close off a plurality of fluid passages in said test head in accordance with selected physical characteristics of tested caps, detecting back pressure in said passages, creating characteristic fluidic signals in response to detection of said back pressure, feeding said signals to storage means, storing said fluidic signals for a predetermined time, and triggering release of said stored signals from said storage means by feeding periodic signals to said storage means, and controlling the sorting of caps in response to the character of the detected signals.

58. A method of testing manufactured articles comprising passing fluid through plural fluid passages in the testing head portion of a test apparatus, comprising positioning said article adjacent said testing head, moving a control valve within said testing head in response to a dimension of the article being tested, said movement closing one of said passages to create back pressure therein, and closing off fluid flow within another of said passages in the testing head by surrounding said testing head with at least portions of said article being tested to create back pressure therein, generating control signals in response to the creation of said back pressures, feeding signals indicative of the presence of back pressures to one storage area and feeding signals indicative of lack of back pressures to another storage area, subsequently supplying a signal to said storage area to release said stored signals and separating articles characterized by the inability thereof to create said back pressure from articles able to create said back pressure by association with said tester.

59. A combined article forming and testing apparatus comprising a testing head and a work support, means supporting said testing head and work support for relative movement together and apart, cooperating article forming means on said work support and said testing head for performing an article shaping operation in response to said relative movement, and testing means carried by said testing head engageable with a shaped article for ascertaining the physical dimensional characteristics of a shaped article other than fluid tightness.

60. The apparatus of claim 59 wherein said testing means includes first and second relatively movable articles engaging members, and fluid flow control means carried by said first and second members for providing varied fluid flow characteristics in accordance with the tested physical characteristics of a tested article.

61. A method of forming and testing articles comprising the steps of engaging an unfinished article with a combined forming and testing head, effecting relative movement between the article and the head to further shape the article, effecting movement of portions of said head by the article in accordance with the physical dimensional characteristics of the article, detecting the movement of said head portions, and determining whether the movements are within predetermined requirements.

62. The method of claim 61 wherein the movement of said head portions control fluid flow and said detecting and determining steps are fluidic steps.

* * * * *